US010217136B2

(12) United States Patent
Mikuriya et al.

(10) Patent No.: US 10,217,136 B2
(45) Date of Patent: Feb. 26, 2019

(54) DISTRIBUTION CONTROL DEVICE, DISTRIBUTION CONTROL METHOD, PROGRAM, AND STORAGE MEDIUM

(71) Applicant: Rakuten, Inc., Tokyo (JP)

(72) Inventors: Jun Mikuriya, Tokyo (JP); Nagaaki Hoshi, Tokyo (JP)

(73) Assignee: Rakuten, Inc., Tokyo (JP)

(*) Notice: Subject to any disclaimer, the term of this patent is extended or adjusted under 35 U.S.C. 154(b) by 320 days.

(21) Appl. No.: 15/310,505

(22) PCT Filed: May 14, 2014

(86) PCT No.: PCT/JP2014/062877
§ 371 (c)(1),
(2) Date: Nov. 11, 2016

(87) PCT Pub. No.: WO2015/173918
PCT Pub. Date: Nov. 19, 2015

(65) Prior Publication Data
US 2017/0076333 A1    Mar. 16, 2017

(51) Int. Cl.
*G06Q 30/00*  (2012.01)
*G06Q 30/02*  (2012.01)
(52) U.S. Cl.
CPC ........ *G06Q 30/0267* (2013.01); *G06Q 30/02* (2013.01); *G06Q 30/0277* (2013.01)
(58) Field of Classification Search
CPC . G06Q 30/0267; G06Q 30/0277; G06Q 30/02
(Continued)

(56) References Cited

U.S. PATENT DOCUMENTS 6,438,575 B1* 8/2002 Khan ................ G06F 17/30905
707/E17.121
7,730,143 B1* 6/2010 Appelman .............. H04L 51/14
709/206
(Continued)

FOREIGN PATENT DOCUMENTS

JP    2004-78625 A    3/2004
JP    2006-79309 A    3/2006
JP    2013-77181 A    4/2013

OTHER PUBLICATIONS

International Search Report for PCT/JP2014/062877 dated Aug. 12, 2014 [PCT/ISA/210].

*Primary Examiner* — Luis A Brown
(74) *Attorney, Agent, or Firm* — Sughrue Mion, PLLC

(57) ABSTRACT

A distribution control device includes a selection screen presentation processing part which displays a selection screen on a user terminal, a content generation part which generates terminal-determinable content to which a source code is added, a terminal information management part, a target terminal setting part, and a distribution processing part which distributes the terminal-determinable content based on the distribution target terminal type. The terminal information management part manages a terminal type answered based on the selection screen as answer information for each user, and accumulates and manages a terminal type determined according to a browsing of the distributed terminal-determinable content as terminal determination information for each user. The target terminal setting part determines a main terminal type mainly used by a user based on the accumulated terminal determination information, and sets a distribution target terminal type for each user based on the answer information and the main terminal type.

11 Claims, 12 Drawing Sheets

(58) Field of Classification Search
USPC .............................. 705/14.49, 14.64, 14.73
See application file for complete search history.

(56) References Cited

U.S. PATENT DOCUMENTS

| | | | |
|---|---|---|---|
| 7,788,271 B2* | 8/2010 | Soma | G06F 21/10 705/75 |
| 8,423,417 B2* | 4/2013 | Heck | G06Q 30/0243 705/26.1 |
| 8,613,070 B1* | 12/2013 | Borzycki | G06F 21/6218 726/8 |
| 8,935,247 B1* | 1/2015 | Tholome | G06F 17/3071 706/16 |
| 9,264,522 B1* | 2/2016 | Reeves | H04L 69/24 |
| 9,307,383 B1* | 4/2016 | Patrick | H04W 4/90 |
| 2001/0017885 A1* | 8/2001 | Asai | H04L 29/06 375/220 |
| 2001/0049733 A1* | 12/2001 | Tokumaru | G06F 9/451 709/225 |
| 2002/0026502 A1* | 2/2002 | Phillips | H04L 29/06 709/219 |
| 2002/0073034 A1* | 6/2002 | Wagner | G06Q 30/02 705/51 |
| 2006/0184579 A1* | 8/2006 | Mills | H04N 7/173 |
| 2007/0260393 A1* | 11/2007 | Abernethy, Jr. | G01C 21/3644 701/438 |
| 2008/0102802 A1* | 5/2008 | Do | H04M 1/72552 455/414.2 |
| 2009/0228868 A1* | 9/2009 | Drukman | G06F 9/44505 717/121 |
| 2009/0292375 A1* | 11/2009 | Thompson | G08C 17/00 700/81 |
| 2010/0146607 A1* | 6/2010 | Piepenbrink | G06F 21/6218 726/7 |
| 2010/0325571 A1* | 12/2010 | Kodosky | G05B 19/0426 715/772 |
| 2012/0081607 A1* | 4/2012 | Kitazato | H04N 21/43615 348/552 |
| 2012/0143692 A1* | 6/2012 | Packer | G06Q 30/0207 705/14.64 |
| 2012/0254791 A1* | 10/2012 | Jackson | G06F 3/04815 715/781 |
| 2012/0289213 A1* | 11/2012 | Levien | H04W 4/16 455/417 |
| 2013/0166684 A1* | 6/2013 | Park | H04L 65/4069 709/217 |
| 2014/0059142 A1* | 2/2014 | Gandhi | H04W 4/12 709/206 |
| 2014/0113646 A1* | 4/2014 | Maggenti | H04L 67/306 455/452.1 |
| 2014/0282720 A1* | 9/2014 | Heck | H04N 21/812 725/35 |
| 2015/0178782 A1* | 6/2015 | Kim | G06Q 30/0267 705/14.64 |
| 2015/0237410 A1* | 8/2015 | Yu | H04N 21/812 725/32 |
| 2015/0382335 A1* | 12/2015 | Mikuriya | H04L 5/0048 370/329 |

* cited by examiner

FIG. 5

| USER ID | E-MAIL ADDRESS | TERMINAL TYPE INFORMATION | | | | |
| --- | --- | --- | --- | --- | --- | --- |
| | | ANSWER INFORMATION | TERMINAL DETERMINATION | ... | TERMINAL TYPE INFORMATION | MAIN TERMINAL TYPE | DISTRIBUTION TARGET TERMINAL TYPE |
| 00001 | OOO@△△.com | SMART PHONE | SMART PHONE | ... | SMART PHONE | SMART PHONE | SMART PHONE |
| ... | ... | ... | ... | ... | ... | ... | ... |

DISTRIBUTION CONTROL DEVICE, DISTRIBUTION CONTROL METHOD, PROGRAM, AND STORAGE MEDIUM

CROSS REFERENCE TO RELATED APPLICATIONS

This application is a National Stage of International Application No. PCT/JP2014/062877, filed on May 14, 2014, the contents of all of which are incorporated herein by reference in their entirety.

TECHNICAL FIELD

The present invention relates to a technical field of a distribution control device, a distribution control method, a program, and a storage medium regarding distribution processing of content distributed to a user. Specifically, the present invention relates to distribution processing of content accommodating a terminal type of a user.

CITATION LIST

Patent Literature

Patent Document 1: Japanese Unexamined Patent Application Publication No. 2006-079309

BACKGROUND ART

As described in Patent Document 1, as an advertising method for products, the method using e-mails has been popular. As a terminal through which a user browses the e-mails, in addition to a feature phone and a Personal Computer (PC), a terminal such as a smart phone has been popular.

Generally, browsing advertising e-mails through the smart phone, which features instant browsability, is likely to produce higher advertising value compared with browsing through the PC.

In view of this situation, prices for advertisement may be changed between the distribution of e-mails for advertisement for the smart phones and the distribution of e-mails for advertisement for the PCs.

In this case, the e-mails distributed for the smart phones are preferably browsed with the smart phones.

SUMMARY OF THE INVENTION

Technical Problem

However, users who browse an e-mail distributed to the identical e-mail address through the PC or browse the e-mail through the smart phone or users who use a different browsing terminal according to the situation have increased. Thus, the selection whether to browse the distributed e-mail through the PC or to browse the e-mail through the smart phone is basically left to the users; therefore, the distributor cannot control the browsing terminal.

Therefore, an object of the present invention is to control a content distribution such that content such as an e-mail, which is generated and distributed according to a terminal type with which the e-mail is to be browsed, is browsed with a terminal of an appropriate type as much as possible.

Solution to Problem

First, a distribution control device according to the present invention includes a selection screen presentation processing part, a content generation part, a terminal information management part, a target terminal setting part, and a distribution processing part. The selection screen presentation processing part is configured to execute processing to display a selection screen on a user terminal. The selection screen is configured to prompt selecting a terminal type for browsing content distributed based on registered content distribution destination information. The content generation part is configured to generate terminal-determinable content to which a source code is added. The source code is configured to determine a terminal type used for browsing the content. The terminal information management part is configured to manage a terminal type answered based on the selection screen as answer information for each user. The terminal information management part is configured to accumulate and manage a terminal type determined according to a browsing of the distributed terminal-determinable content as terminal determination information for each user. The target terminal setting part is configured to determine a main terminal type mainly used by a user based on the accumulated terminal determination information. The target terminal setting part is configured to set a distribution target terminal type for each user based on the answer information and the main terminal type. The distribution processing part is configured to execute distribution processing of the terminal-determinable content based on the distribution target terminal type.

Therefore, by using the answer information and the terminal determination information in combination, content is distributed considering the terminal type used by the user to browse the e-mails.

Second, the distribution control device according to the above-described present invention is configured as follows. The target terminal setting part is configured to set the distribution target terminal type based on the answer information when the target terminal setting part obtains the answer information.

This distributes the content relying on the terminal type answered by the user.

Third, the distribution control device according to the above-described present invention is configured as follows. As a terminal type, at least a first type terminal and a second type terminal are provided. In a state where the latest answer information and the distribution target terminal type are set as the first type terminal, in the case where the second type terminal is determined as the main terminal type, the target terminal setting part is configured to set the second type terminal as the distribution target terminal type. In a state where the latest answer information and the distribution target terminal type are set as the second type terminal or in a state where the answer information is failed to be obtained and the distribution target terminal type is set as the second type terminal, in the case where the first type terminal is determined as the main terminal type, the target terminal setting part is configured to maintain a state where the second type terminal is set as the distribution target terminal type. The selection screen presentation processing part is configured to execute processing to display the selection screen.

Accordingly, the distribution setting is configured according to the user's selection. That is, although the answer information is the first type terminal, if the main terminal type is determined as the second type terminal, the distribution target terminal type is set as the second type terminal without change.

In a state where the answer information is the second type terminal or unanswered, if the main terminal type is determined as the first type terminal, the distribution target terminal type is not directly set to the first type terminal, but the selection screen to prompt the selection of the terminal type for browsing the content is presented. This means that to set the first type terminal as the distribution target terminal type, at least the answer information from the user is required to be the first type terminal.

That is, determination as the first type terminal and distribution of the e-mail for the first type terminal is carefully executed relying on the answer information from the user.

Accordingly, in the case where the cost changes depending on the content or a similar case, the content distributed for the first type terminal is designed so as to be browsed through the first type terminal as much as possible.

Fourth, the distribution control device according to the above-described present invention is configured as follows. In a state where the latest answer information is set as the first type terminal and the distribution target terminal type is set as the second type terminal, in the case where the first type terminal is determined as the main terminal type, the target terminal setting part is configured not to display the selection screen but set the distribution target terminal type as the first type terminal.

This sets the distribution target terminal type without presenting the selection screen to the user again.

This is because that, since the answer information from the user is the first type terminal, a transition of the distribution target terminal type from the second terminal type to the first terminal type goes along the user's intension. Accordingly, the presentation of the selection screen again is unnecessary.

Fifth, the distribution control device according to the above-described present invention is configured as follows. In the case where an answer based on the selection screen is not obtained, the target terminal setting part is configured to set the second type terminal as the distribution target terminal type.

The distribution of the e-mail targeting the first type terminal is carefully executed relying on the answer information from the user. Accordingly, if the answer information is not obtained, the second type terminal is preferentially set as the distribution target terminal type.

This allows providing the distribution control device by which the advertisement cost is reduced in the case where, for example, the effect of the advertisement for first type terminal is high but the cost is high.

Sixth, the distribution control device according to the above-described present invention is configured as follows. As a terminal type, a first type terminal and a second type terminal are provided. The target terminal setting part is configured to set the distribution target terminal type for each user for a user who has accepted a distribution of content for the first type terminal. The distribution processing part is configured to execute the distribution processing.

Accordingly, among the two terminal types, in the case where the user has accepted only the distribution of content for one terminal type or a similar case, extra setting of distribution terminal type and distribution processing are not executed.

Seventh, the distribution control device according to the above-described present invention is configured as follows. The target terminal setting part is configured to determine the main terminal type using a proportion of a terminal type in the accumulated terminal determination information.

This eliminates a need for complicated calculations in the processing to determine the main terminal type.

Eighth, the distribution control device according to the above-described present invention is configured as follows. As a terminal type, a first type terminal and a second type terminal are provided. The target terminal setting part is configured to determine the first type terminal as a main terminal type according to a proportion of the first type terminal in the accumulated terminal determination information exceeding a first threshold. The target terminal setting part is configured to determine the second type terminal as the main terminal type according to the proportion of the first type terminal in the terminal determination information falling below a second threshold.

This allows providing the distribution control device that can handle various determination conditions on the terminal type.

Ninth, the distribution control device according to the above-described present invention is configured as follows. The first threshold is set to a value larger than the second threshold.

This provides a hysteresis to the threshold when changing the main terminal type, ensuring preventing frequent change in the main terminal type.

Tenth, the distribution control device according to the above-described present invention is configured as follows. One or both the first threshold and the second threshold are set according to the terminal type with which a web page to register content distribution destination information has been browsed.

This allows estimating the terminal type mainly used by the user. This allows providing the distribution control device that can set the threshold according to the user's present situation.

Eleventh, the distribution control device according to the above-described present invention is configured as follows. In the case where an answer based on the selection screen is obtained, the target terminal setting part is configured to determine the main terminal type based on the terminal determination information accumulated after the answer.

Accordingly, until the predetermined count of terminal determination information is accumulated, the main terminal type is not determined and the selection screen is not presented to the user. This allows providing the distribution control device not bothering the user.

A distribution control method according to the present invention is: executing processing to display a selection screen on a user terminal, the selection screen being configured to prompt selecting a terminal type for browsing content distributed based on registered content distribution destination information; generating terminal-determinable content to which a source code is added, the source code being configured to determine a terminal type used for browsing the content; managing a terminal type answered based on the selection screen as answer information for each user, accumulating and managing a terminal type determined according to a browsing of the distributed terminal-determinable content as terminal determination information for each user; determining a main terminal type mainly used by a user based on the accumulated terminal determination information, setting a distribution target terminal type for each user based on the answer information and the main terminal type; and executing distribution processing of the terminal-determinable content based on the distribution target terminal type.

This distribution control method distributes the content accommodating the terminal type used by the user.

A program according to the present invention is a program that causes a processing unit to execute the processing executed as the distribution control method.

A storage medium according to the present invention is a storage medium storing the program. These program and storage medium achieve the above-described distribution control device.

Advantageous Effects of Invention

The content where the terminal type used by the user is accommodated is distributed. This allows the content distributed to the smart phones is likely to be browsed with the smart phones.

The present invention can control the content distribution such that the content such as the e-mail, which is generated and distributed according to the terminal type with which the e-mail is to be browsed, is browsed with a terminal of an appropriate type as much as possible.

BRIEF DESCRIPTION OF DRAWINGS

FIG. 5 is a drawing for describing an exemplary user database;

DESCRIPTION OF EMBODIMENTS

The following describes embodiments with an exemplary service providing system 1 to provide a user with service.

The service provided to the user can be, for example, a set of services such as a clearance related to a credit card and a set of services such as buying and selling of products at online shopping malls.

The following describes embodiments in the order listed below.
1. General Arrangement
2. Hardware Configuration
3. Flow of Processing
3-1. Flow of Processing during Service Registration
3-2. Flow of Processing regarding Browsing e-mails
4. Main Terminal Type Determination Processing
4-1. First Exemplary Processing
4-2. Second Exemplary Processing
5. Modification According to Display of Modal Screen
5-1. First Modification
5-2. Second Modification
6. Other Modifications
7. Summary
8. Programs and Storage Mediums
1. General Arrangement The following describes a general arrangement of a network system including the service providing system 1 according to the embodiment with reference to FIG. 1 and FIG. 2.

Figure 1:
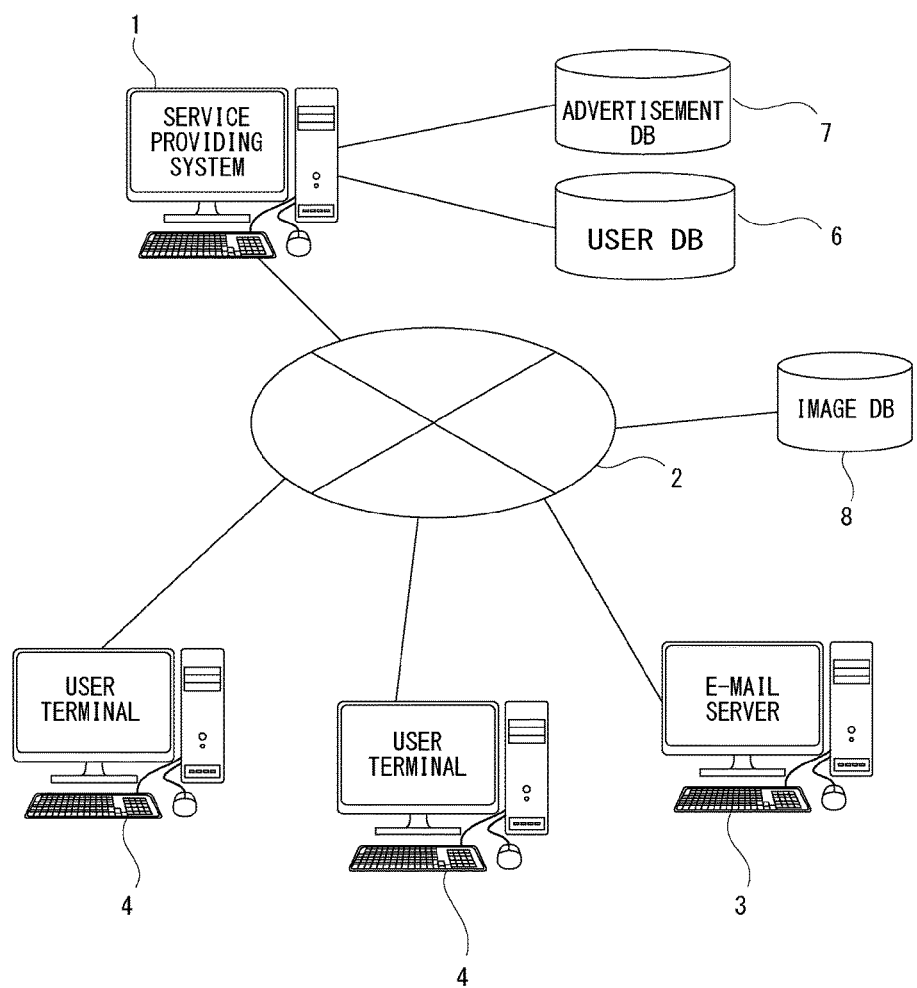
FIG. 1 illustrates a general arrangement of an embodiment of the present invention.

As illustrated in FIG. 1, the service providing system 1, which provides the user with various services, is mutually communicatively coupled to an e-mail server 3, user terminals 4, 4, and so on via a communication network 2.

The service providing system 1 includes an information processing device. The information processing device has functions such as a function to provide various services, a function to manage the users, and a function to manage advertisements.

The function to provide services is a function to conduct various services for the users. For example, the function performs processing to generate HyperText Markup Language (HTML) data of various web pages and to cause a user terminal 4 to display the HTML data, and login processing of the user. In the case where the service providing system 1 is a system that provides a set of services related to the credit card, for example, the function performs processing to cause the user to browse a usage status of the credit card. In the case where the service providing system 1 is a system that provides various services in the online shopping mall, for example, the function performs processing to search a product based on a product search by the user and processing to register the product as a favorite.

The function to manage the users performs processing to store user information in a database, processing to obtain the user information from the database, or similar processing.

The function to manage advertisements performs processing to manage information such as an advertisement attached to the e-mail distributed to the users and an advertisement to be displayed on a web browser operated on the user terminal 4. The function also performs processing to store advertisement data obtained from a new advertiser in the database, processing to delete an unnecessary advertisement from the database, or similar processing.

The configuration of the communication network 2 is not especially limited. For example, the Internet, an intranet, an extranet, a Local Area Network (LAN), a Community Antenna TeleVision (CATV) communication network, a Virtual Private Network, a telephone network, a mobile telecommunication network, a satellite communication network, or a similar network is assumed.

Various examples of a transmission medium constituting the all or a part of the communication network 2 are also assumed. For example, a wire system, such as the Institute of Electrical and Electronics Engineers (IEEE) 1394, a Universal Serial Bus (USB), a power-line carrier, and a telephone line, an infrared radiation, such as an Infrared Data Association (IrDA), and also a wireless system, such as the Bluetooth (registered trademark), the 802.11 wireless, a mobile phone network, a satellite channel, and a digital terrestrial network are applicable.

Figure 2:
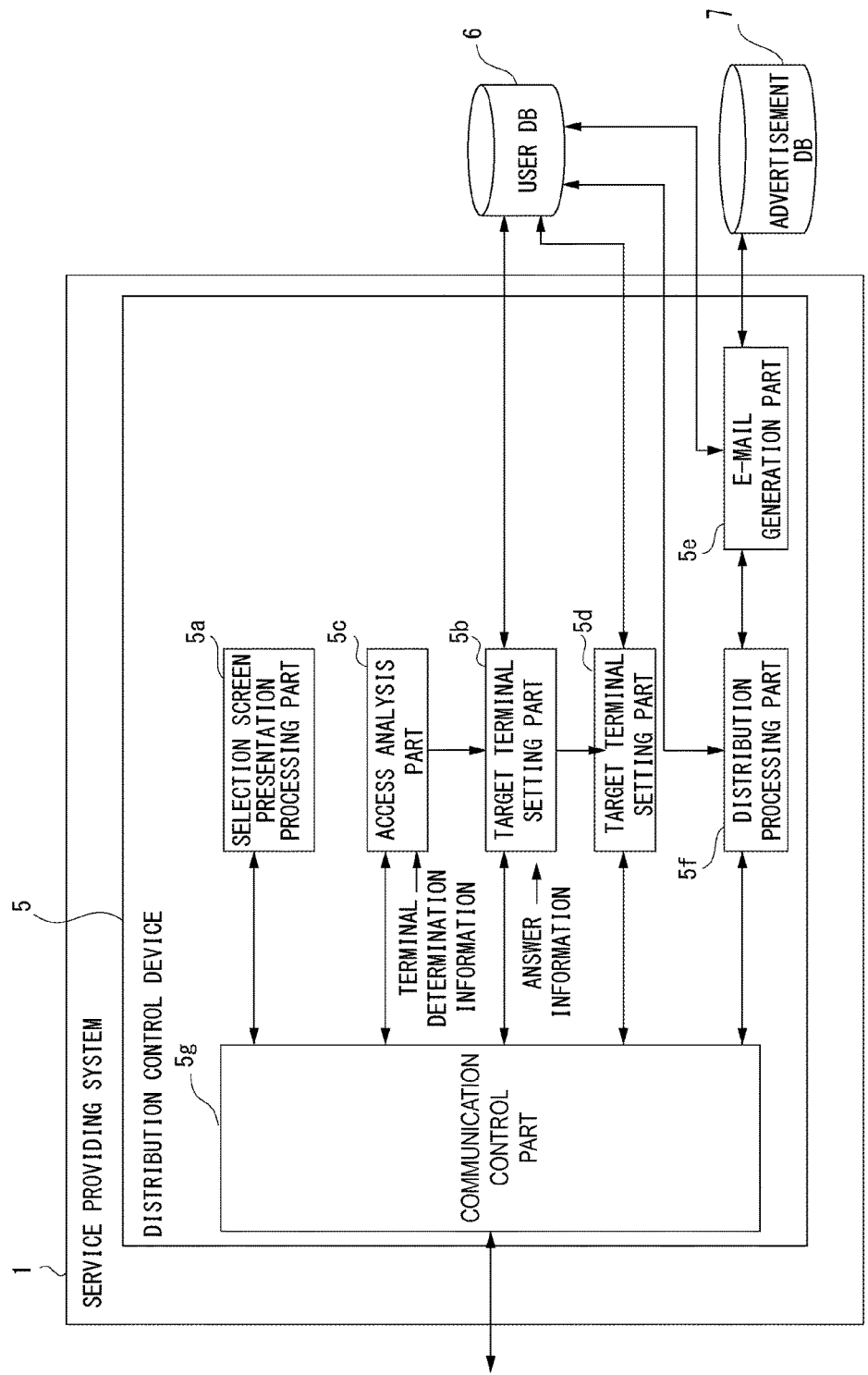
FIG. 2 illustrates a block diagram of a distribution control device of this embodiment.

As illustrated in FIG. 2, the service providing system 1 includes a distribution control device 5. The distribution control device 5 executes various processes, which will be described later, to distribute content to the users.

The embodiment describes an example where the distribution control device 5 is used as a device that distributes the e-mails accompanied with the service provided to the users by the service providing system 1. The e-mails that the distribution control device 5 distributes to the users are, for example, e-mails such as e-mail magazines to which an advertisement of a product is attached.

The e-mail such as the e-mail magazine in the embodiment corresponds to "content" in the claims of the present invention. An e-mail address corresponds to "content distribution destination information" in the claims of the present invention.

When the e-mail server 3 illustrated in FIG. 1 receives the e-mail addressed to a user who has an e-mail box in his/her storage area, the e-mail server 3 executes processing to distribute the e-mail to the e-mail box of this user. When the e-mail server 3 receives the e-mail addressed to the user who does not have the e-mail box in his/her storage area, the e-mail server 3 executes processing to transfer the received e-mail to another e-mail server 3 (not illustrated). Further, according to an e-mail browsing request from the user, the e-mail server 3 also executes processing to transmit information on the e-mail to the user terminal 4 or similar processing.

The user terminal 4 is a terminal used by the user to browse the e-mails distributed from the distribution control device 5. The user terminal 4 is, for example, a Personal Computer (PC) having a communication function, a feature phone, Personal Digital Assistants (PDA), or a smart device such as a smart phone and a tablet terminal.

The distribution control device 5 illustrated in FIG. 2 generates the e-mails to which the advertisement is attached considering the terminal type of the user terminals 4, 4, and so on and distributes the e-mails to the user terminals 4, 4, and so on. To execute these processes, the service providing system 1 is coupled to a user database (DB) 6, an advertisement DB 7, and an image DB 8 to ensure transmission and reception of information with them. The user DB 6 stores information such as a user identification (ID), an e-mail address as the content distribution destination information, and the terminal type of the user. The advertisement DB 7 stores the information on the advertisement. The image DB 8 stores an image file used for the analysis of the terminal type for browsing the e-mails.

The distribution control device 5, as illustrated in FIG. 2, includes a selection screen presentation processing part 5a, a terminal information management part 5b, an access analysis part 5c, a target terminal setting part 5d, an e-mail generation part 5e as a content generation part, a distribution processing part 5f, and a communication control part 5g.

The above-described respective parts in the distribution control device 5 may be configured with a single information processing device. The distribution control device 5 may be configured with a plurality of information processing devices including an information processing device that has functions such as the above-described function to provide the various services, the above-described function to manage the users, and the above-described function to manage the advertisements.

Figure 3:
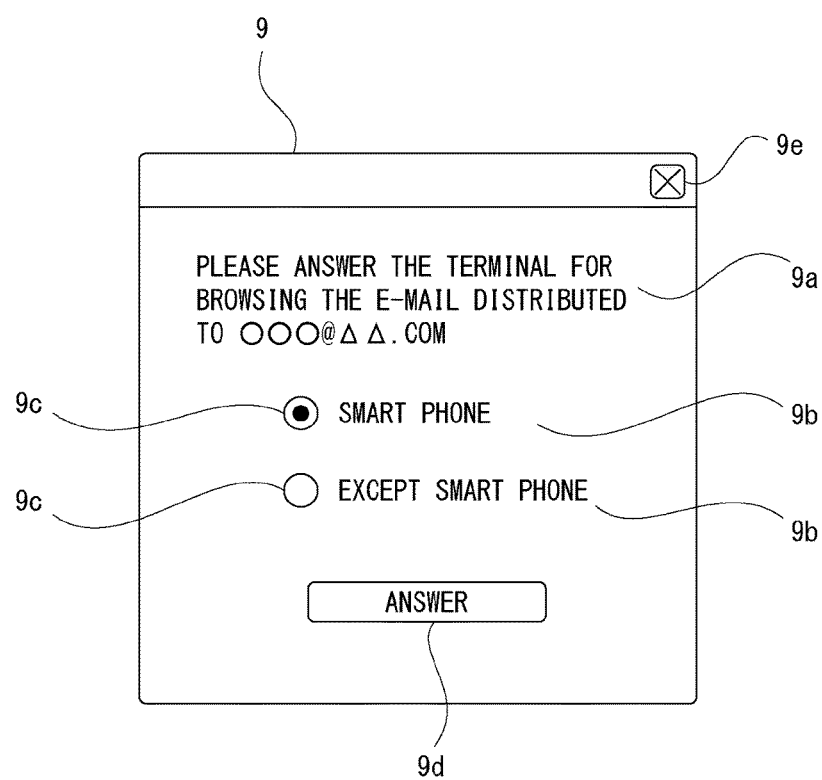
FIG. 3 illustrates a modal screen as a selection screen.

The selection screen presentation processing part 5a executes processing to cause the user terminal to display a selection screen. The selection screen causes the user to select the terminal type for browsing the distributed e-mails. For example, as illustrated in FIG. 3, the user terminal displays a modal screen 9 as the selection screen.

The modal screen 9 is a screen, which is displayed on the user terminal 4, to disable returning to the previous screen if the user does not appropriately response, for example, response to an inquiry. Generally, the modal screen 9 is used to for example, display important information such as error information and input required information.

The modal screen 9 displays a sentence "Please answer the terminal for browsing the e-mail distributed to ○○○@ΔΔ.com" as an explanation 9a. Below the explanation 9a, the modal screen 9 displays an option item name 9b, "smart phone" and the option item name 9b, "except the smart phone." To the left of the respective option item names 9b, respective radio buttons 9c are disposed. An answer button 9d is disposed below the option item name 9b. Pressing the answer button 9d transmits the information on the option item name 9b selected by the radio button 9c to the distribution control device 5.

The modal screen 9 includes a close button 9e at the upper right. The close button 9e terminates the display of the modal screen 9 without the answer to the inquiry displayed on the modal screen 9. When pressing the close button 9e, the information of the option item name 9b selected by the radio button 9c is not transmitted to the distribution control device 5 but the display of the modal screen 9 is terminated.

The terminal information management part 5b manages the terminal type obtained by the response of the user to the modal screen 9 as the selection screen for each user as answer information. The terminal information management part 5b manages the terminal type of the user determined by browsing a terminal-determinable e-mail, which will be described later, as terminal-determinable content, which can specify the type terminal, by the user as the terminal determination information for each user.

The terminal determination information is information that is determined for the terminal type used for browsing for each e-mail. That is, when ten e-mails have been opened, ten pieces of the terminal determination information can be obtained.

The answer information and the terminal determination information are stored in the user DB 6 and are managed for each user. Especially, regarding the answer information, when a plurality of pieces of the answer information of the identical user is present, the user DB 6 stores the latest answer information.

An access analysis part 5c analyzes an access to the image file during browsing the terminal-determinable e-mail, which will be described later. Specifically, the access analysis part 5c executes processing to analyze the access to the image file stored in the image DB 8 by the user.

Figure 4:
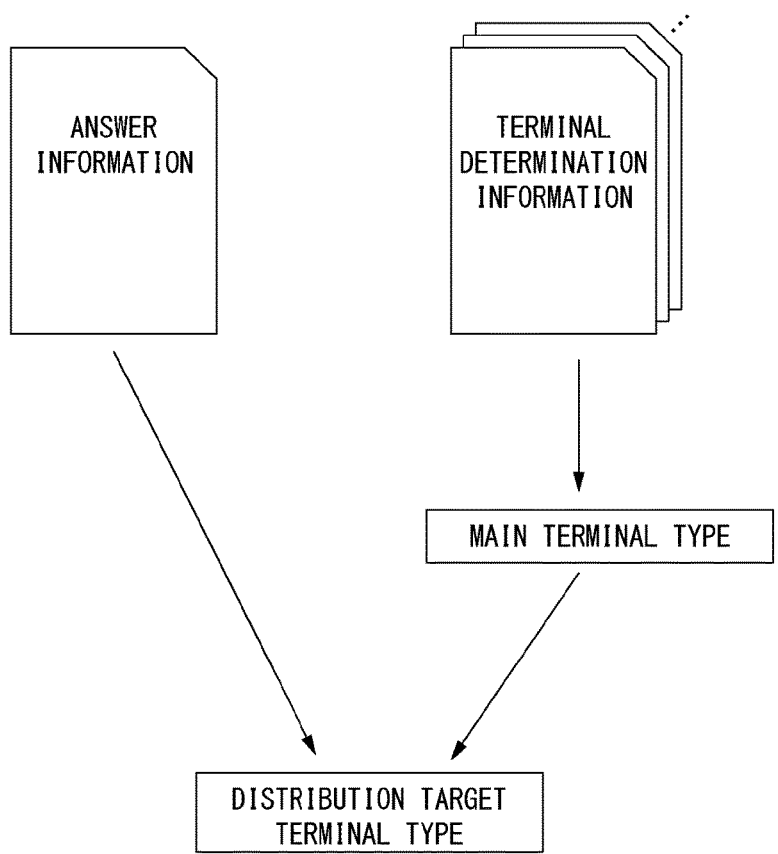
FIG. 4 is a drawing for describing a relationship of various terminal type information.

The target terminal setting part 5d determines to which terminal type that the e-mail should be generated for each user and executes processing to store the result in the user DB 6 as a distribution target terminal type. Specifically, as illustrated in FIG. 4, the target terminal setting part 5d first determines the main terminal type from the terminal determination information. The main terminal type is the terminal type mainly used by the user. For example, the main terminal type is may be determined from the latest terminal determination information. The user DB 6 stores the determined main terminal type for each user.

Subsequently, the target terminal setting part 5d sets the distribution target terminal type based on the above-described answer information and main terminal type, which are managed for each user, and stores the distribution target terminal type in the user DB 6.

The e-mail generation part 5e in FIG. 2 executes processing to generate the e-mail to which a source code for determining the terminal type of the user used for browsing the e-mail is added as the terminal-determinable e-mail. The source code for determining the terminal type is, for example, an image tag embedded into the e-mail. Browsing the e-mail generates an access to the image file stored in the image DB 8 based on the embedded image tag. The analysis of this access allows determining the terminal type used for browsing the e-mail by the user.

The image tag is added to the e-mail such that each user accesses a different image file. This allows access analysis of each user. To achieve this, the e-mail generation part 5e executes processing to store image file information of each user (for example, a URL to the image and an image ID) in the user DB 6.

Further, the e-mail generation part 5e executes processing to obtain the information on the advertisement from the advertisement DB 7 and attach the advertisement to the terminal-determinable e-mail.

The distribution processing part 5f executes processing to distribute the terminal-determinable e-mail, which is generated by the e-mail generation part 5e, to the respective users based on the distribution target terminal type stored in the user DB 6.

The communication control part 5g executes a control to cause the distribution control device 5 to exchange information with an external terminal or a similar terminal. Specifically, the communication control part 5g executes a control for communications on presentation of the modal screen 9 to the user, communications on the distribution of the e-mails, and communications on the analysis of the image file stored in the image DB 8.

The user DB 6, for example, as illustrated in FIG. 5, associates the user ID, the e-mail address, and the terminal type information and stores them. The terminal type information includes the answer information, the terminal determination information, and respective information of the main terminal type and the distribution target terminal type. The answer information is obtained based on the modal screen 9 presented to the user. The terminal determination information is obtained based on the browsing of the terminal-determinable e-mail distributed to the user. The main terminal type is determined from the terminal determination information. The distribution target terminal type is set from the answer information and the main terminal type.

The information stored in the user DB 6 illustrated in FIG. 5 is an extract of a part of the user information regarding a certain e-mail magazine (for example, "∘∘ Communications"). Accordingly, the respective users described in the table are users who have permitted the distribution of "∘∘ Communications." Distribution permission information for "∘∘ Communications" for each user (for example, a distribution permission flag) may be stored. In this case, the table can include a user who once permitted the distribution but after that rejected the distribution. One table may summarize the user information regarding all e-mail magazines. In this case, the user DB 6 stores the distribution permission information for the respective e-mail magazines.

The advertisement DB 7 stores the information on the advertisement attached to the e-mail distributed to the user.

The image DB 8 stores an image file associated with a Uniform Resource Locator (URL) added to the terminal-determinable e-mail as the image tag.

2. Hardware Configuration

Figure 6:
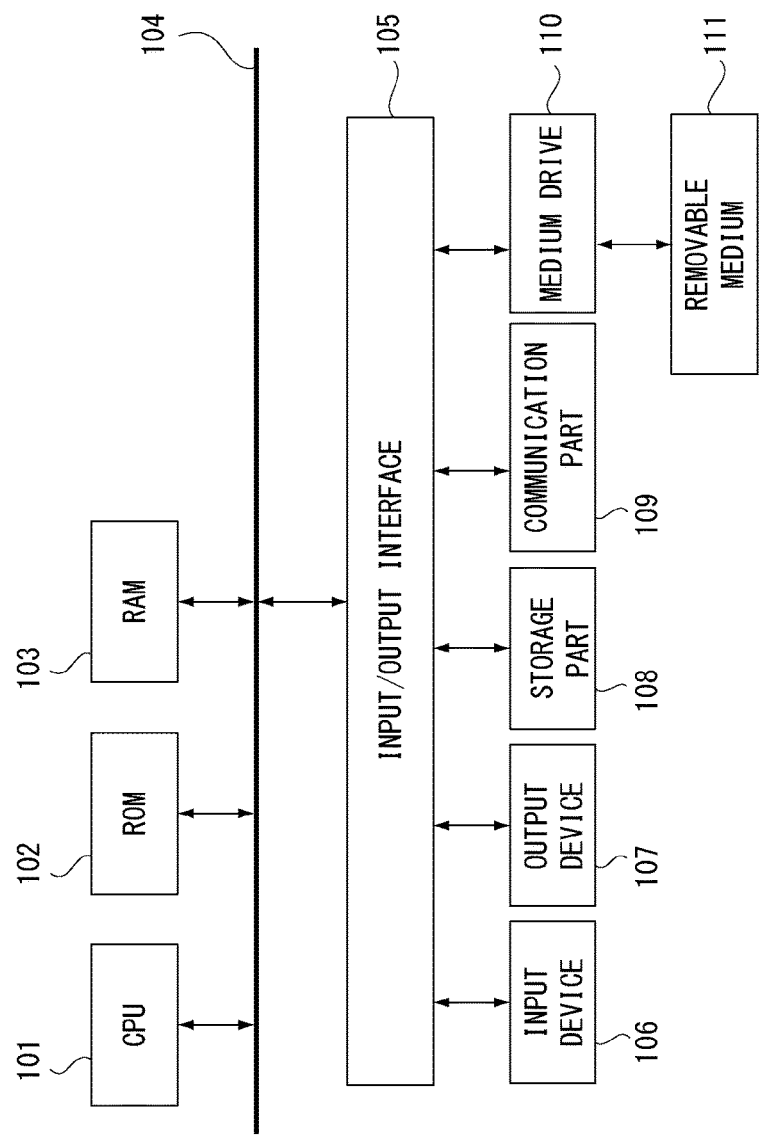
FIG. 6 is a block diagram of a computer of this embodiment.

FIG. 6 is a drawing illustrating exemplary hardware of various information processing devices, the distribution control device 5, the e-mail server 3, and the user terminal 4 belonging to the service providing system 1 illustrated in FIG. 1 and FIG. 2. A Central Processing Unit (CPU) 101 of a computer device in each server and terminal executes various processing in accordance with a program stored in a Read Only Memory (ROM) 102 or a program loaded from a storage part 108 to a Random Access Memory (RAM) 103. The RAM 103 also appropriately stores data required for the CPU 101 to execute various processing or similar data.

The CPU 101, the ROM102, and the RAM 103 are mutually coupled via a bus 104. To this bus 104, an input/output interface 105 is also coupled.

To the input/output interface 105, an input device 106 formed of a keyboard, a computer mouse, a touchscreen, and a similar component, a display formed of a Liquid Crystal Display (LCD), a Cathode Ray Tube (CRT), an organic Electroluminescence (EL) panel, and a similar component, an output device 107 formed of a speaker and a similar component, the storage part 108 formed of a Hard Disk Drive (HDD), a flash memory device, and a similar component, and a communication part 109 that executes communication processing via the communication network 2 or a device-to-device communications are coupled.

Additionally, to the input/output interface 105, a medium drive 110 is coupled as necessary and a removable medium 111 such as a magnetic disk, an optical disk, a magneto-optical disk, a semiconductor memory, or a similar medium is appropriately mounted to write and read information to/from the removable medium 111.

Such computer device can upload and download data and a program through communications by the communication part 109 and exchange the data and the program via the removable medium 111.

When the CPU 101 executes processing operations based on various programs, the various information processing devices such as the distribution control device 5, the e-mail server 3, and the user terminal 4 belonging to the service providing system 1 each executes information processing and communications described later.

The various information processing devices such as the distribution control device 5 and each information processing device constituting the e-mail server 3 and the user terminal 4 belonging to the service providing system 1 are not limited to the configuration with a single computer device as illustrated in FIG. 3. The plurality of computer devices may be systematized and be configured. The plurality of computer devices may be systematized with, the LAN or a similar medium. Alternatively, the plurality of computer devices may be remotely disposed with, for example, the Virtual Private Network (VPN) using the Internet or a similar medium.

3. Flow of Processing

Figure 7:
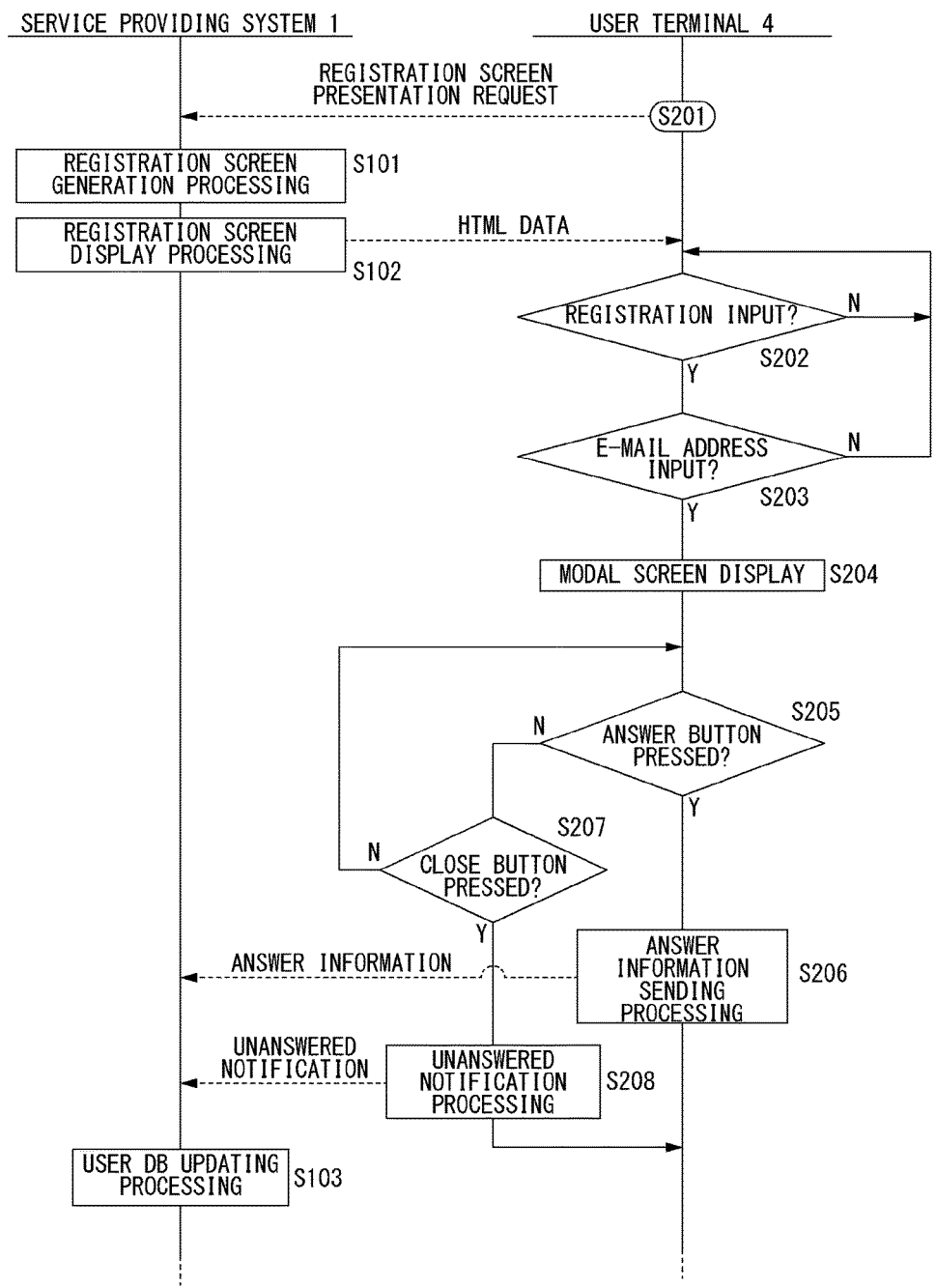
FIG. 7 illustrates a flowchart of processing during service registration of the embodiment.
Figure 8:
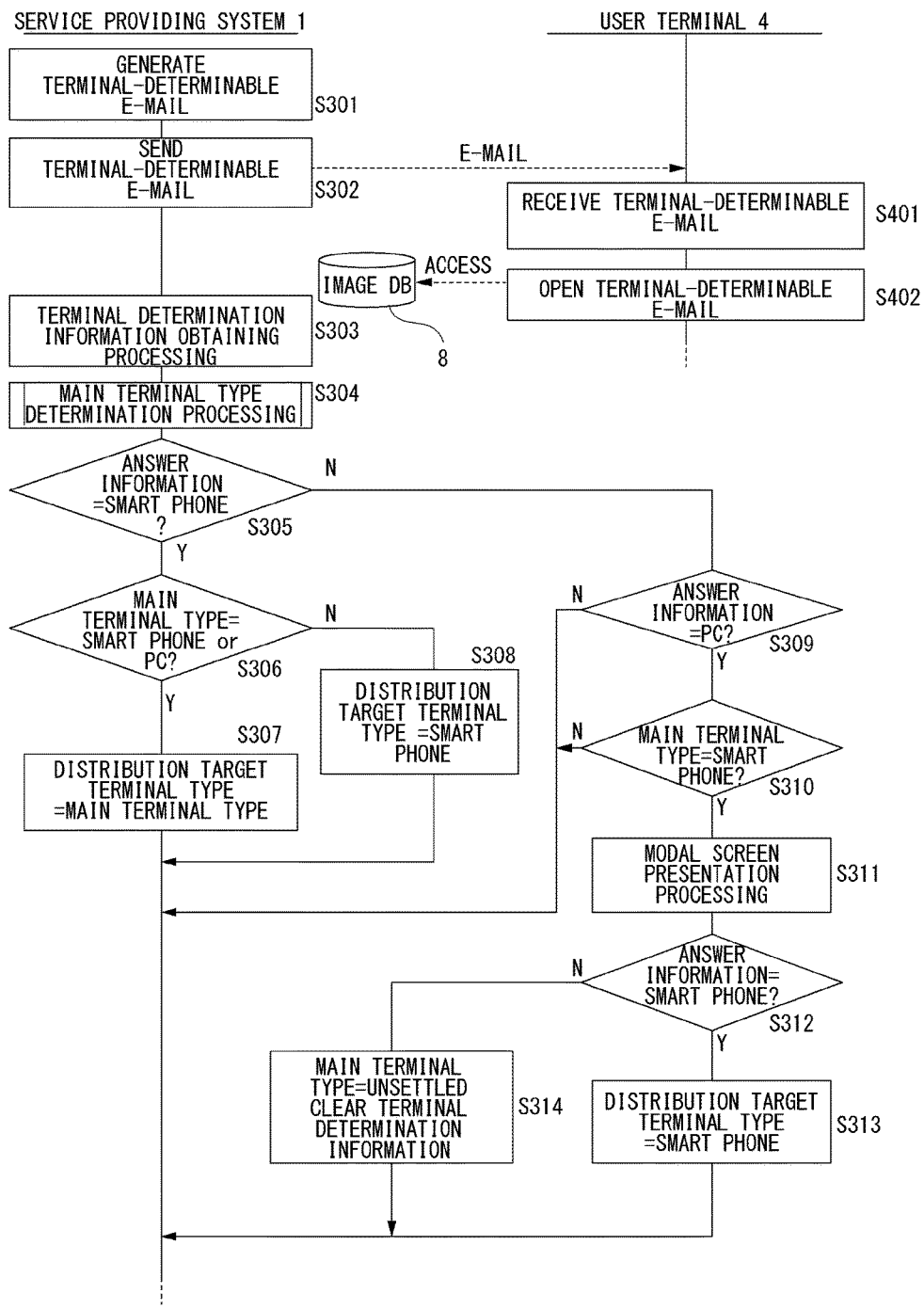
FIG. 8 illustrates a flowchart of processing during browsing an e-mail of the embodiment.

The following describes a flow of each processing executed by the distribution control device 5 with reference to FIG. 7 and FIG. 8.

3-1. Flow of Processing during Service Registration

First, the following describes the flow of processing during the service registration with reference to FIG. 7.

The processing shown by the dashed lines in FIG. 7 represents information, a request, or similar data transmitted/received between the service providing system 1 and the user terminal 4.

The processing during the service registration is processing executed first to register the user information required for the user to enjoy the service provided by the service providing system 1. For example, the processing is executed by execution of a predetermined operation by the user on a user registration page transitionable from a web page opened for using the service by the user.

In the processing during the service registration, the user terminal 4 first executes registration screen request processing at Step S201 as shown in FIG. 7.

In the registration screen request processing, after the user terminal 4 executes a display request of the registration screen to the service providing system 1, at Step S101, the service providing system 1 executes registration screen generation processing. The registration screen generation processing may generate HTML data to display the registration screen whenever the service providing system 1 receives the request. The registration screen generation processing may obtain the HTML data stored in any of the databases.

Subsequently, at Step S102, the service providing system 1 executes processing to display the registration screen on the web browser on the user terminal 4. Here, for example, the service providing system 1 executes processing to transmit the HTML data, which is generated at Step S 101, to the user terminal 4 or similar processing.

The user terminal 4 that has received the HTML data displays the web page based on the HTML data on the user terminal 4. After that, at Step S202, the user terminal 4 executes processing to determine whether the registration information has been input or not. In the case where the user terminal 4 determines that the registration information has been input at Step S202, the user terminal 4 determines whether the e-mail address has been input or not at Step S203. In the case where the user terminal 4 determines that the e-mail address has been input at Step S203, the user terminal 4 displays the modal screen 9, which is illustrated in FIG. 3, at Step S204. Specifically, a source code to display the modal screen 9 according to a character string input to an input field for the e-mail address is executed.

Here, at Step S204, the selection screen presentation processing part 5a executes processing to display the modal screen 9, which causes the user to select the terminal type. The selection screen presentation processing part 5a executes this processing as processing to transmit the HTML data to which the source code for displaying the modal screen 9 is added.

Insofar as ensuring causing the user to input the terminal for browsing the e-mails, the modal screen 9 may not be used. For example, the registration screen may show the terminal types together with the radio buttons under the input field for the e-mail address to cause the user to select the terminal type.

If the user terminal 4 determines that the registration information is not input at Step S202 and determines that the e-mail address is not input at Step S203, the user terminal repeatedly executes the processing at Step S202

After the user terminal 4 displays the modal screen 9, the user terminal 4 executes processing to determine whether the answer button 9d has been pressed or not at Step S205. When the user terminal 4 determines that the answer button 9d has been pressed at Step S205, the user terminal 4 executes answer information transmission processing at Step S206. After the execution of the answer information transmission processing, the user terminal 4 transmits the answer information to the service providing system 1.

When the user terminal 4 determines that the answer button 9d has not been pressed at Step S205, the user terminal 4 determines whether the close button 9e has been pressed or not at Step S207. When the user terminal 4 determines that the close button 9e has been pressed at Step S207, the user terminal 4 executes unanswered notification processing at Step S208. The unanswered notification processing transmits the fact that the user does not answer to the explanation 9a, which is displayed on the modal screen 9, that is, the question inquiring about the terminal type for browsing the e-mails (unanswered notification) to the service providing system 1.

When the user terminal 4 determines that the close button 9e has not been pressed at Step S207, this means that both the answer button 9d and the close button 9e on the modal screen 9 have not been pressed. The user terminal 4 executes the processing at Step S205 again.

When the service providing system 1 receives the answer information in response to Step S206, or receives the unanswered notification in response to Step S208, the service providing system 1 executes user DB update processing at Step S103.

The user DB update processing executes processing to set the answer information and the information on the distribution target terminal type to the user DB 6. With the distribution target terminal type, when the answer is obtained from the user, the terminal type based on the user's answer is set as the distribution target terminal type.

Here, a description will be given of the terminal types used in the following description. The following description classifies the terminal type into two terminal types: "smart phone" as a first type terminal and "PC" as a second type terminal. A terminal type other than "smart phone" and "PC" (for example, the feature phone) is all classified as "PC." As the answer information, three types: the case of "smart phone", the case of "PC", and the case of failing to obtain the answer information ("unanswered") will be considered.

Therefore, the setting of the distribution target terminal type at Step S103 sets the distribution target terminal type to "smart phone" in the case of the answer information being "smart phone", sets the distribution target terminal type to "PC" in the case of the answer information being "PC." The setting also sets the distribution target terminal type to "PC] in the case of the answer information being "unanswered."

Although the description is omitted in the flow of processing during the service registration shown in FIG. 7, processing to store the user information such as the ID, and the password of the user, which are required to use the service provided by the service providing system 1, in the user DB 6 is also appropriately executed.

The user DB update processing at Step S103 may be executed after terminating a sequence of input work to the input items provided on the registration screen and pressing a complete button and a register button.

3-2. Flow of Processing regarding Browsing e-mails

Subsequently, the following describes flow of respective processing when the user browses the distributed e-mail with reference to FIG. 8.

First, the e-mail generation part 5e of the service providing system 1 generates the terminal-determinable e-mail to which the source code for determining the terminal type used for browsing the e-mail is added at Step S301. To this e-mail, for example, an image tag including a link to the image file is embedded so as to allow the determination on terminal. The image DB 8 stores the image file. When analyzing the access to the image DB 8 that occurs when the user browses the e-mail, the service providing system 1 is allowed to obtain the user information. As necessary, the e-mail generation part 5e executes processing to obtain the advertisement data to be attached to the terminal-determinable e-mail from the advertisement DB 7 and add the advertisement data to the terminal-determinable e-mail.

Subsequently, the distribution processing part 5f of the service providing system 1 transmits the terminal-determinable e-mail at Step S302. In association with this processing, the terminal-determinable e-mail is distributed to the e-mail server 3 where the e-mail box for the user is installed. The terminal-determinable e-mail is distributed targeting the e-mail addresses stored in the user DB 6.

Subsequently, the user terminal 4 executes the reception processing of the terminal-determinable e-mail at Step S401. The reception processing is, for example, processing to receive a notification of distribution of a new e-mail to the e-mail server 3 where the e-mail box for the user is installed and processing to receive the information on the e-mail distributed from the e-mail server 3 to the user terminal 4.

Next, based on the user operation, the user terminal 4 executes open processing of the terminal-determinable e-mail at Step S402. The open processing executes processing to display the body text of the e-mail on software (a mailer) for browsing the e-mail. Additionally, the open processing executes processing to access the image file stored in the image DB 8 based on the source code added to the terminal-determinable e-mail. This processing allows the service providing system 1 to grasp the terminal type or similar information of the user terminal 4. For example, the analysis of the access to the image file, which is stored in the image DB 8, from the user terminal 4 allows obtaining the information such as the terminal type of the user terminal 4. For example, colorless, transparent one-pixel image is used as the image file.

Subsequently, the access analysis part 5c of the service providing system 1 executes terminal determination information obtaining processing at Step S303. The terminal determination information obtaining processing executes processing to obtain the user information and information on the terminal type used for browsing the e-mail in association with opening the terminal-determinable e-mail and transmit the information to the terminal information management part 5b. That is, the terminal determination information obtaining processing analyzes the access to the image file stored in the image DB 8 to obtain the information on the terminal type used by the user.

The terminal information management part 5b that has received the user information and the terminal determination information executes processing to store the terminal determination information in the user DB 6. That is, whenever one terminal-determinable e-mail is opened, the terminal information management part 5b obtains one piece of terminal determination information and the user DB 6 accumulates the terminal determination information.

Next, the target terminal setting part 5d of the service providing system 1 executes the main terminal type determination processing at Step S304. The main terminal type determination processing is processing to obtain the terminal determination information for each user accumulated in the user DB 6 to determine the main terminal type based on the terminal determination information, and to store the main terminal type in the user DB 6. The main terminal type determination processing is processing to determine the terminal type mainly used for browsing the e-mails by the user. That is, the main terminal type is information on the terminal type mainly used by the user determined in association with browsing the e-mails.

The main terminal type determination processing will be described later with some examples.

After executing the main terminal type determination processing, the target terminal setting part 5d of the service providing system 1 executes branch processing depending on the terminal type obtained by the answer information from the user who has opened the e-mail at Step S305.

The target terminal setting part 5d determines whether the answer information obtained from the user DB 6 is "smart phone" or not and executes the branch processing at Step S305. When the target terminal setting part 5d determines that the answer information is "smart phone", the target terminal setting part 5d executes the branch processing depending on the main terminal type of the user who has opened the e-mail at Step S306.

As the main terminal type, for example, three types of statuses: "smart phone", "PC", and "unsettled" are provided.

The target terminal setting part 5d executes the branch processing depending on whether the main terminal type is "smart phone" or "PC" or not at Step S306. When the main terminal type is "smart phone" or "PC", that is, except for "unsettled", the target terminal setting part 5d executes processing to set the main terminal type as the distribution target terminal type and stores the distribution target terminal type in the user DB 6 at Step S307. That is, when the main terminal type is "smart phone", processing to set "smart phone" to the distribution target terminal type is executed. When the main terminal type is "PC", processing to set "PC" to the distribution target terminal type is executed.

The information on the main terminal type here may be obtained from the user DB 6. Alternatively, the result of the main terminal type determination processing, which is executed at Step S304, may be stored in the storage area in the service providing system 1 and the information may be obtained from the storage area.

At the determination processing at Step S306, when the main terminal type is "unsettled", the target terminal setting part 5d executes processing to set "smart phone" as the distribution target terminal type at Step S308. That is, considering that the result of confirming the answer information from the user is "smart phone" at Step S305, the processing sets the distribution target terminal type relying on the answer information from the user.

When the answer information stored in the user DB 6 at Step S305 is determined as not "smart phone", that is, when the answer information is "PC" or "unanswered", the target terminal setting part 5d of the service providing system 1 executes processing to determine whether the answer information is "PC" or not at Step S309. When the target terminal setting part 5d determines that the answer information is "PC", the target terminal setting part 5d executes the branch processing depending on whether the main terminal type is "smart phone" or not at Step S310. If the main terminal type is "smart phone", that is, although the answer information is "PC", the main terminal type obtained by the determination on the terminal actually used for browsing the e-mail is "smart phone", the selection screen presentation processing part 5a of the service providing system 1 executes modal screen display processing to display the modal screen 9, which is illustrated in FIG. 3, at Step S311. That is, since the answer information and the main terminal type differ, the processing confirms the terminal type to the user.

The modal screen 9 may be displayed when the user logs in to the service provided by the service providing system 1. In this case, the modal screen display processing at Step S311 executes processing to turn "ON" a modal screen display flag stored in the user DB 6. Therefore, when the user logs in to the service, the service providing system 1 confirms the modal screen display flag. Thus, the modal screen display processing can display the modal screen 9 to obtain the answer information on the terminal type.

Subsequently, the target terminal setting part 5d of the service providing system 1 executes processing to determine whether the answer information is "smart phone" or not at Step S312. This processing is processing to confirm the answer information based on the modal screen 9, which is presented to the user at Step S311. Accordingly, the processing is executed after completion of the operation to the modal screen 9 displayed at Step S311. Therefore, to display the modal screen 9 when the user logs in to the service using the modal screen display flag as described above, after completing the operation to the modal screen 9 after login, the processing at Step S312 is executed. The completion of the operation to the modal screen 9 means completion of the operation of pressing the answer button 9*d* or the operation of pressing the close button 9*e* in FIG. 3.

When the target terminal setting part 5*d* of the service providing system 1 determines that the answer information is "smart phone" at Step S312, since both the answer information and the main terminal type are "smart phone", the target terminal setting part 5*d* sets "smart phone" to the distribution target terminal type at Step S313. The terminal information management part 5*b* executes processing to store "smart phone" as the answer information in the user DB 6. Further, the target terminal setting part 5*d* executes processing to store "smart phone" as the distribution target terminal type in the user DB 6.

If the target terminal setting part 5*d* of the service providing system 1 determines that the answer information is not "smart phone", that is, determines that the answer information is "PC" or "unanswered" at Step S312, the target terminal setting part 5*d* executes processing to set the main terminal type as "unsettled" and clear the terminal determination information at Step S314. This processing is processing to prevent the modal screen 9 from being displayed on the user terminal 4 whenever the terminal-determinable e-mail is transmitted to the user. For example, if the main terminal type is set based on the latest several pieces of the terminal determination information, the following situation possibly occurs. Although the answer information that the terminal type is "PC" is obtained from the user based on the modal screen, according to the browsing of the subsequent terminal-determinable e-mail, Step S310 determines that the main terminal type is "smart phone" again from the latest several pieces of the terminal determination information. This executes the modal screen display processing at Step S311. Therefore, to minimize that the user feels troublesome by frequent presentation of the modal screen 9, after obtaining the answer information (including the case of unanswered) based on the presentation of the modal screen 9 at Step S311, the terminal determination information is cleared and the main terminal type is changed to "unsettled." This minimizes the presentation of the modal screen 9 in a period until the user DB 6 accumulates predetermined pieces of the terminal determination information again.

The terminal information management part 5*b* executes processing to store the answer information obtained from the result of the modal screen display processing at Step S311 in the user DB 6 at Step S314. At this time, if the obtained answer information is "unanswered", the user DB 6 may store "unanswered." When storing previous answer information of "smart phone" or "PC", the user DB 6 may keep storing "smart phone" or "PC." That is, the processing keeps storing the latest effective answer information except for "unanswered."

When the target terminal setting part 5*d* determines that the answer information is not "PC" at Step S309, that is, determines that the answer information cannot be obtained (="unanswered"), a sequence of processing when the user browses the distributed e-mail, which is shown in FIG. 8, is terminated.

When the main terminal type is not "smart phone" at Step S310, that is, the answer information is "PC" and the main terminal type is "PC" or "unsettled", similarly, a sequence of processing shown in FIG. 8 is terminated.

To summarize the above-described sequence of processing with the concrete example, the processing like the following is executed.

(1) In the case where the latest effective (not unanswered) answer information is "smart phone"

The e-mail for smart phones is distributed.

Afterwards, when the e-mail is browsed through the PC and the main terminal type is determined as "PC", the e-mail for PCs is distributed.

Further, after that, when the e-mail is browsed through the smart phone and the main terminal type is determined as "smart phone", the subsequent e-mails are switched for e-mails for smart phones again and are distributed.

After that, the e-mails are appropriately switched based on the main terminal type and are distributed.

(2) In the case where the latest effective (not unanswered) answer information is "PC"

The e-mail for PCs is distributed (the terminal determination information is obtained at every distribution).

Afterwards, when the e-mail is browsed through the smart phone and the main terminal type is determined as "smart phone", the modal screen 9 is presented to the user.

Depending on the user's answer to the modal screen 9, the processing transitions to (1), (2), or (3).

(3) In the case where the answer information is "unanswered" at the present

The distribution to the terminal type determined as the distribution target at the time point is continued.

However, in this case, until the answer information becomes "smart phone" or "PC", the modal screen 9 is regularly (for example, once a month) presented to the user. This prevents the answer information from being kept as "unanswered."

4. Main Terminal Type Determination Processing 4-1. First Exemplary Processing

Figure 9:
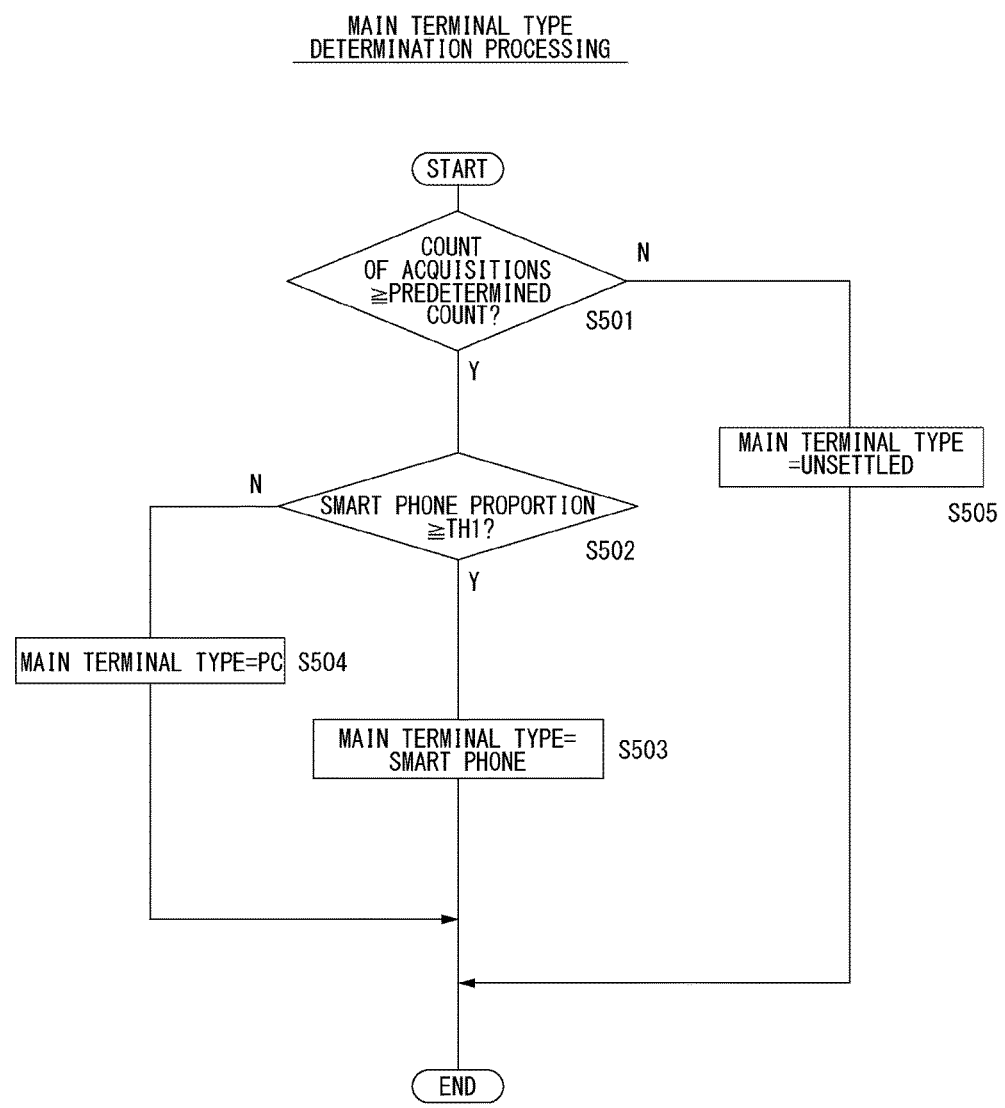
FIG. 9 illustrates exemplary main terminal type determination processing of the embodiment.

The following describes the first exemplary processing of the main terminal type determination processing with reference to FIG. 9. The first exemplary processing of the main terminal type determination processing determines the main terminal type by, for example, a proportion of "smart phone" in the latest terminal determination information or whether a count of pieces of the terminal determination information is equal to or more than a threshold or not. Here, an example of determining the main terminal type using the proportion of "smart phone" will be described.

First, the target terminal setting part 5*d* of the service providing system 1 determines whether the count of acquisitions of the terminal determination information is equal to or more than the predetermined count or not at Step S501. When the target terminal setting part 5*d* determines that the count of acquisitions of the terminal determination information is equal to or more than the predetermined count, the target terminal setting part 5*d* determines whether the proportion of "smart phone" is equal to or more than a threshold TH1 or not at Step S502. For example, in the case where the predetermined count of the count of acquisitions of the terminal determination information is set to 10 and whether the proportion of smart phone is equal to or more than 60 percent or not is determined, TH1=60 (percent) is set. In this case, assume that the user DB 6 accumulates equal to or more than 10 pieces of the latest terminal determination information. When "smart phone" is equal to or more than six, the target terminal setting part 5d determines that the proportion of "smart phone" is equal to or more than the threshold TH1. Assume that the user DB 6 does not accumulate equal to or more than 10 pieces of the latest terminal determination information; therefore, 10 pieces of the latest terminal determination information cannot be obtained. The target terminal setting part 5d determines that the count of acquisitions of the terminal determination information is less than the predetermined count (=10 pieces) at Step S501.

When the target terminal setting part 5d of the service providing system 1 determines that the proportion of "smart phone" is equal to or more than the threshold TH1 at Step S502, the target terminal setting part 5d determines "smart phone" as the main terminal type at Step S503. The target terminal setting part 5d executes processing to store "smart phone" as the main terminal type in the user DB 6.

When the target terminal setting part 5d determines that the proportion of "smart phone" is less than the threshold TH1 at Step S502, the target terminal setting part 5d determines the main terminal type as "PC" at Step S504. The target terminal setting part 5d executes processing to store "PC" as the main terminal type in the user DB 6.

When the target terminal setting part 5d of the service providing system 1 determines that the count of acquisitions of the terminal determination information is less than the predetermined count at Step S501, the target terminal setting part 5d determines that the main terminal type is "unsettled" at Step S505. The target terminal setting part 5d executes processing to store "unsettled" as the main terminal type in the user DB 6.

4-2. Second Exemplary Processing

Figure 10:
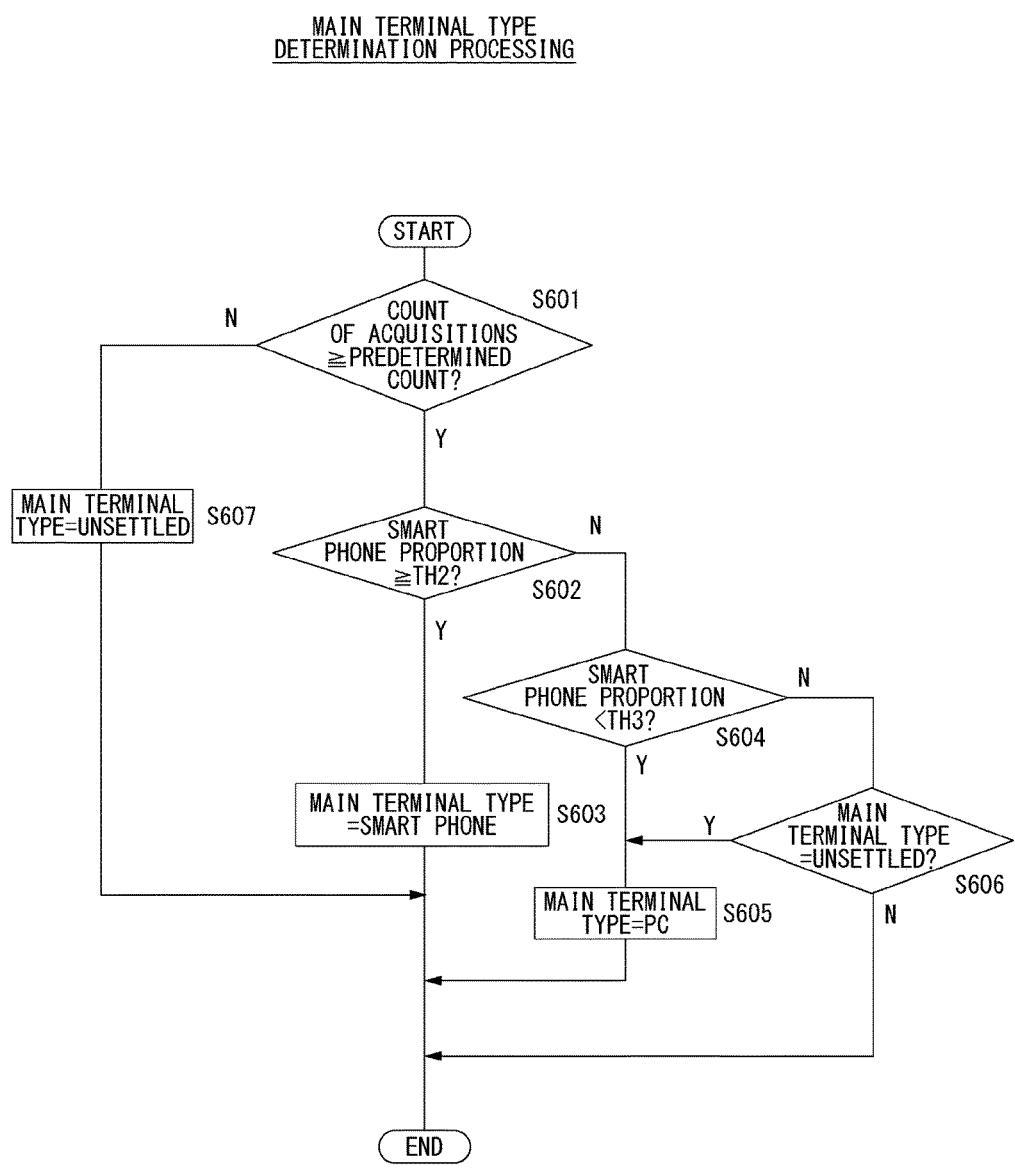
FIG. 10 illustrates another exemplary main terminal type determination processing of the embodiment.

Next, the following describes the second exemplary processing of the main terminal type determination processing with reference to FIG. 10. In the second exemplary processing of the main terminal type determination processing, when the proportion of "smart phone" in the latest terminal determination information or the count of pieces of the latest terminal determination information is equal to or more than a first threshold, the target terminal setting part 5d determines that the main terminal type is "smart phone." When the proportion of "smart phone" or the count of pieces of the latest terminal determination information is less than a second threshold (<first threshold), the target terminal setting part 5d determines that the main terminal type is "PC." That is, a hysteresis is provided to the thresholds when changing the main terminal type. Here, a description will be given with a first threshold as TH2 and a second threshold as TH3 (<TH2).

First, at Step S601, the target terminal setting part 5d of the service providing system 1 determines whether the count of acquisitions of the terminal determination information is equal to or more than the predetermined count or not. This processing is similar to the processing at Step S501.

In the case where the count of acquisitions of the terminal determination information is determined as being equal to or more than the predetermined count at Step S601, the target terminal setting part 5d determines whether the proportion of "smart phone" in the latest terminal determination information is equal to or more than the threshold TH2 or not at Step S602.

When the target terminal setting part 5d determines that the proportion of "smart phone" is equal to or more than the threshold TH2 at Step S602, the target terminal setting part 5d determines the main terminal type as "smart phone" at Step S603. The target terminal setting part 5d executes processing to store "smart phone" as the main terminal type in the user DB 6.

When the target terminal setting part 5d determines that the proportion of "smart phone" is less than the threshold TH2 at Step S602, the target terminal setting part 5d determines whether the proportion of "smart phone" in the latest terminal determination information is less than the threshold TH3 or not at Step S604.

When the target terminal setting part 5d determines that the proportion of "smart phone" is less than the threshold TH3 at Step S604, the target terminal setting part 5d determines that the main terminal type is "PC" at Step S605. The target terminal setting part 5d executes processing to store "PC" as the main terminal type in the user DB 6.

When the target terminal setting part 5d determines that the proportion of "smart phone" is equal to or more than the threshold TH3 at Step S604, that is, the proportion of "smart phone" is less than the threshold TH2 and equal to or more than the threshold TH3, the target terminal setting part 5d executes branch processing depending on whether the main terminal type already stored in the user DB 6 is "unsettled" or not at Step S606. When the main terminal type stored in the user DB 6 is "unsettled", the target terminal setting part 5d determines the main terminal type as "smart phone." The target terminal setting part 5d executes processing of Step S605 that stores "smart phone" as the main terminal type in the user DB 6.

If the main terminal type stored in the user DB 6 is not "unsettled" at Step S606, that is, any one of "smart phone" or "PC" is stored as the main terminal type, a sequence of processing is terminated while keeping the setting of the main terminal type until then ("smart phone" or "PC").

Figure 11:
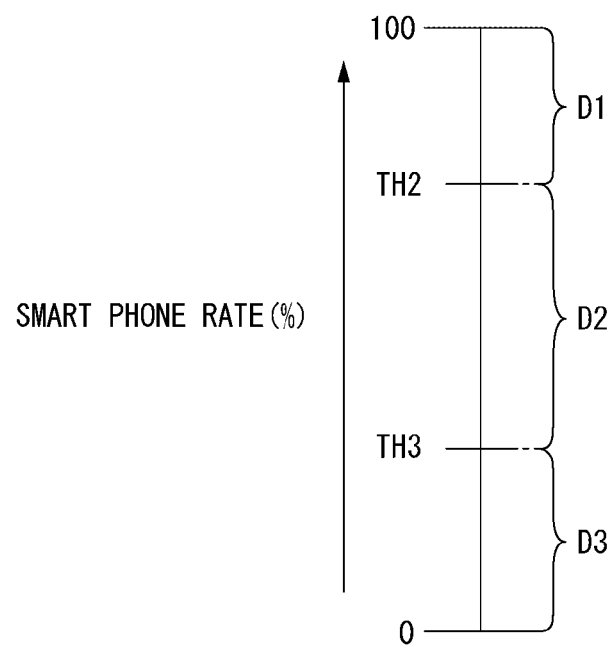
FIG. 11 is a drawing for schematically describing the other exemplary main terminal type determination processing of the embodiment.

The following summarizes the second exemplary processing. As illustrated in FIG. 11, in the case where the proportion of "smart phone" in the latest terminal determination information is equal to or more than the threshold TH2, that is, the proportion belongs to the D1 range in FIG. 11, the target terminal setting part 5d determines that the main terminal type is "smart phone."

In the case where the proportion of "smart phone" in the latest terminal determination information is less than the threshold TH3, that is, the proportion belongs to the D3 range in FIG. 11, the target terminal setting part 5d determines that the main terminal type is "PC."

Further, in the case where the proportion of "smart phone" in the latest terminal determination information is equal to or more than the threshold TH3 and less than the threshold TH2, that is, the proportion belongs to the D2 range in FIG. 11, the main terminal type is basically not changed but maintained. However, in the case where the main terminal type is "unsettled", the target terminal setting part 5d determines that the main terminal type is "PC."

5. Modification According to Display of Modal Screen 5-1. First Modification

Figure 12A:
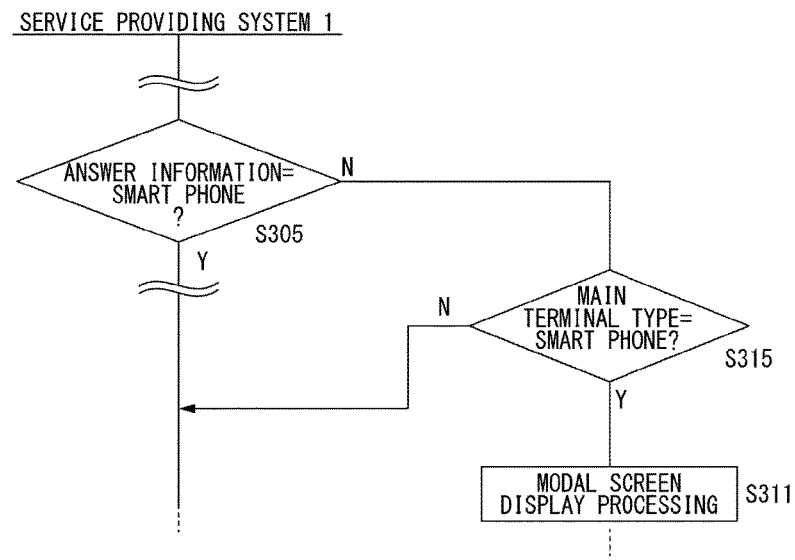
FIGS. 12A and 12B illustrate a modification according to a display of the modal screen.

The following describes a first modification with reference to FIG. 12A.

The first modification differs in a part of the processing continuous from Step S305 to Step S311 in FIG. 8. Therefore, here, only the parts different from FIG. 8 are described.

In the example shown in FIG. 8, if the answer information is not obtained from the user (="unanswered"), the modal screen 9 is not presented to the user. That is, unless the answer information from the user differs from the main terminal type determined by the service providing system 1, the modal screen 9 is not presented to the user. In contrast to this, even if the answer information is not obtained, when the service providing system 1 determines the main terminal type as "smart phone", the first modification presents the modal screen 9 to the user.

In the processing that determines the terminal type obtained by the answer information from the user at Step S305, when the target terminal setting part 5d determines that the answer information is not "smart phone", that is, determines that the answer information is "PC" or "unanswered", the target terminal setting part 5d executes branch processing depending on whether the main terminal type is "smart phone" or not at Step S315.

When the main terminal type is "smart phone" at Step S315, the selection screen presentation processing part 5a executes the modal screen display processing shown in FIG. 3 at Step S311.

When the main terminal type is "PC" or "unsettled" at Step S315, the selection screen presentation processing part 5a terminates a sequence of processing.

To summarize more specifically, the processing like the following is executed.
(1) In the case where the latest effective (not unanswered) answer information is "smart phone"
   The e-mail for smart phones is distributed.
   Afterwards, when the e-mail is browsed through the PC and the main terminal type is determined as "PC", the e-mail for PCs is distributed.
   Further, after that, when the e-mail is browsed through the smart phone and the main terminal type is determined as "smart phone", the subsequent e-mails are switched for e-mails for smart phones again and are distributed.
   After that, the e-mails are appropriately switched based on the main terminal type and are distributed.
(2) In the case where the latest effective (not unanswered) answer information is "PC"
   The e-mail for PCs is distributed (the terminal determination information is obtained at every distribution).
   Afterwards, when the e-mail is browsed through the smart phone and the main terminal type is determined as "smart phone", the modal screen 9 is presented to the user.
   Depending on the user's answer to the modal screen 9, the processing transitions to (1), (2), or (3).
(3') In the case where the answer information is "unanswered" at the present
   The e-mail for PCs is distributed (the terminal determination information is obtained at every distribution).
   Afterwards, when the main terminal type is determined as "smart phone" by browsing through the smart phone, the modal screen 9 is presented to the user.
   Depending on the user's answer to the modal screen 9, the processing transitions to (1), (2), or (3).

In the case where the answer information is "unanswered" as well, the modal screen 9 is presented to the user. This eliminates the need for regularly displaying the modal screen 9 to the user.

That is, when frequently distributing the e-mails to the user, an interval at which the main terminal type is determined as "smart phone" is a short period. Accordingly, to prevent frequent display of the modal screen 9, it is considered to cause the modal screen 9 not to be displayed in the case of "unanswered" as described in the flow of processing regarding browsing e-mails. In this case, as described above, the modal screen 9 is regularly presented to the user.

Assume the case where the e-mails are not frequently distributed to the user and therefore an interval of an occasion determining the main terminal type as "smart phone" becomes long. In the case of the answer information being "unanswered", like this modification, it is considered that the modal screen 9 is presented to the user. In this case, even if not grasping the interval and the timing to present the modal screen 9 to the user, the modal screen is presented in a sequence of processing shown in FIG. 12A.

5-2. Second Modification

Figure 12B:
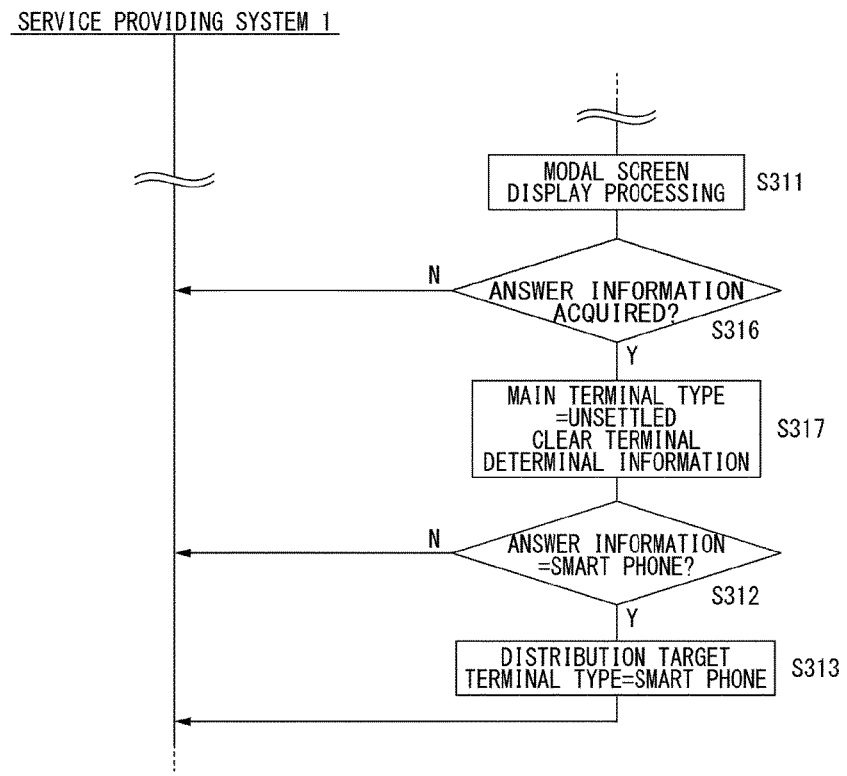

The following describes the second modification with reference to FIG. 12B.

The second modification differs in processing after Step S311 in FIG. 8. Therefore, here, only the parts different from FIG. 8 are described.

After presenting the modal screen 9 at Step S311, the service providing system 1 determines whether the answer information is obtained or not, that is, whether the answer information of "smart phone" or "PC" is obtained or not at Step S316. When the service providing system 1 determines that the answer information is obtained, that is, determines that the answer information is except for "unanswered", the service providing system 1 executes processing to delete the terminal determination information up to the present and processing to set "unsettled" to the main terminal type at Step S317. The processing is executed to execute the processing to determine the main terminal type using the terminal determination information after obtaining the answer information without the use of the information prior to the acquisition of the answer information from the user.

Subsequently, the target terminal setting part 5d of the service providing system 1 executes processing to determine whether the answer information is "smart phone" or not at Step S312. When the target terminal setting part 5d of the service providing system 1 determines that the answer information is "smart phone" at Step S312, since both the answer information and the main terminal type are "smart phone", the target terminal setting part 5d sets "smart phone" to the distribution target terminal type at Step S313 and stores the distribution target terminal type in the user DB 6.

When the target terminal setting part 5d determines that the answer information is not "smart phone" at Step S312, that is, determines that the answer information is "PC", a sequence of processing shown in FIG. 12B is terminated.

If the target terminal setting part 5d fails to obtain the answer information (="unanswered") at Step S316 as well, a sequence of processing shown in FIG. 12B is terminated.

6. Other Modifications

The above-described embodiments describe using the example where the first type terminal is "smart phone" and the second type terminal is "PC." However, the type terminals may be classified depending on the screen size. That is, a terminal with small screen size, which is easily carried comparatively, may be set as the first type terminal. Meanwhile, a terminal with large screen size, which is not easily carried, may be set as the second type terminal.

The embodiments are described using the two terminal types, "smart phone" as the first type terminal and "PC" as the second type terminal; however, the terminal types equal to or more than three may be used. That is, for example, the respective processing may be executed using three types of terminal types, "smart phone", "PC", and "feature phone."

Further, a terminal type referred to as a "smart device", which is a combination of the smart phone and a tablet terminal, may be provided. In this case, "smart device" is considered to provide the highest advertising value. Therefore, although the answer information is "PC" and "feature phone", the main terminal type is determined as "smart device", the processing to present the modal screen 9 to the user is executed.

The terminal type including a wearable terminal may be provided. In this case, for example, the terminal type "smart device" may include the wearable terminal. A terminal type "wearable device" may be independently provided.

The following possibly occurs. As a temporary measure, some users browse the e-mail through "smart phone." When the e-mail describes a URL to a web page on which various information, such as product information, is placed, the users review the e-mail through the PC again. Accordingly, whenever the user receives one e-mail, the terminal type used for the last browsing may be obtained as the terminal determination information. The information on the terminal type previously used may be discarded. Depending on the structure of the e-mail (for example, with/without the URL), the distribution target terminal type may be stored separately. For example, the distribution target terminal type of a user A may be set to "smart phone" for the e-mails with URL. The distribution target terminal type may be set to "PC" for the e-mails without URL. Therefore, in this case, the contents of the e-mail without URL are constituted so as to be easily browsed through the smart phone. The contents of the e-mail with URL are constituted so as to be easily browsed through the PC.

The present invention is also applicable to the advertising method using Social Networking Service (SNS). That is, it is considered that a terminal mainly used for the SNS is managed as the main terminal information. Based on the answer information and the main terminal information, the advertisement and the URL provided to the user via the SNS are changed.

Various thresholds for the main terminal type determination processing may be set according to the terminal type with which the web page to register the e-mail address is browsed. That is, for the user who executed the registration to register the e-mail address using the smart phone, for example, the threshold TH2 and the threshold TH3 are set low. Thus, the e-mails for the smart phones may be designed such that the e-mails for the smart phones are likely to be distributed to the users. In this case, the threshold differs depending on the user. Accordingly, it is preferable to store threshold information of each user in the user DB 6 or to store the terminal type with which the web page to register the e-mail address has been browsed for each user.

7. Summary

The above-described distribution control device 5 of the service providing system 1 includes the selection screen presentation processing part 5*a*, the e-mail generation part 5*e*, the terminal information management part 5*b*, the target terminal setting part 5*d*, and the distribution processing part 5*f*. The selection screen presentation processing part 5*a* is configured to execute processing to display the modal screen 9 on the user terminal. The modal screen 9 is configured to prompt selecting a terminal type for browsing the e-mail distributed based on a registered e-mail address. The e-mail generation part 5*e* is configured to generate a terminal-determinable e-mail to which a source code is added. The source code is configured to determine a terminal type used for browsing the e-mail. The terminal information management part 5*b* is configured to manage a terminal type answered on the modal screen 9 as answer information for each user. The terminal information management part 5*b* is configured to accumulate and manage a terminal type determined according to a browsing of the distributed determinable e-mail as terminal determination information for each user. The target terminal setting part 5*d* is configured to determine a main terminal type mainly used by a user based on the accumulated terminal determination information. The target terminal setting part 5*d* is configured to set a distribution target terminal type for each user based on the answer information and the main terminal type. The distribution processing part 5*f* is configured to execute distribution processing of the terminal-determinable e-mail based on the distribution target terminal type. This provides an environment where the e-mails can be generated and transmitted accommodating the terminal type mainly used by the user to browse the e-mails.

Therefore, the use of the answer information and the terminal determination information in combination distributes content considering the terminal type used by the user to browse the e-mails. That is, for example, this allows the e-mails distributed to the smart phones to be browsed with the smart phones as much as possible.

As shown at Step S103 in FIG. 7, when the target terminal setting part 5*d* obtains the answer information, the target terminal setting part 5*d* sets the distribution target terminal type based on this answer information. This allows providing the distribution control device that distributes the e-mails relying on the terminal type answered by the user.

Further, in the example where at least "smart phone" and "PC" are provided as the terminal type, as shown at Step S307 in FIG. 8, when the target terminal setting part 5*d* determines "PC" as the main terminal type with the state where the latest answer information and the distribution target terminal type are "smart phone", the target terminal setting part 5*d* sets "PC" as the distribution target terminal type.

As described at Step S305, Step S315, and Step S311, in the state where the latest answer information and the distribution target terminal type are "PC" or the state where the answer information is "unanswered" and the distribution target terminal type is "PC", when the target terminal setting part 5*d* determines "smart phone" as the main terminal type, the target terminal setting part 5*d* maintains the state of "PC" being set as the distribution target terminal type. The selection screen presentation processing part 5*a* executes processing to display the modal screen 9.

Accordingly, in the case where a cost spent for the distribution of e-mails changes depending on the target terminal type or a similar case, the e-mails distributed for the smart phones are caused to be browsed through the smart phones as much as possible.

Further, as described at Step S305 to Step S307 in FIG. 8, in a state where the latest answer information is "smart phone" and the distribution target terminal type is "PC", when the target terminal setting part 5*d* determines "smart phone" as the main terminal type, the distribution target terminal type is set to "smart phone" without the display of the modal screen 9. This sets the distribution target terminal type without presenting the modal screen 9 to the user again. This allows minimizing the user feeling troublesome.

As described at Step S103 in FIG. 7, if the answer based on the modal screen 9 is not obtained, that is, the answer is "unanswered", the target terminal setting part 5*d* sets "PC" as the distribution target terminal type. This preferentially sets the PC as the distribution target terminal type. This allows providing the distribution control device 5 by which the advertisement cost is reduced in the case where, for example, the effect of the e-mail to which the advertisement for smart phone is attached is high but the cost is also high.

Generally, the e-mails for smart phones to which the advertisement is attached are likely to provide a high advertising effect. Therefore, suppliers of products request that the e-mails for smart phones are desired to be browsed through the smart phones as much as possible. However, if the suppliers also change the e-mails for PCs to the e-mails for smart phones, this causes a problem of high advertisement cost. Therefore, the above-described configuration transmits the e-mails for smart phones to the users who browse the e-mails through the smart phone. Additionally, the configuration transmits the e-mails for PCs to the users who browse the e-mails through the PC. This allows enhancing the advertising effect while reducing the advertisement cost to some extent.

When providing "smart phone" and "PC" as the terminal type, the following processing may be executed. The target terminal setting part 5d sets the distribution target terminal type for each user described in FIG. 7 and FIG. 8 to the users who have accepted the distribution of the content for smart phones. The distribution processing part 5f executes the distribution processing described at Step S302 in FIG. 8.

The presentation of the modal screen 9, which is as illustrated in FIG. 3, is meaningless for the user who does not accept the distribution of the content for smart phones. This allows reducing processing load of the distribution control device 5.

Further, as described in the first exemplary processing of the main terminal type determination processing, the target terminal setting part 5d determines the main terminal type using the proportion of the terminal type in the accumulated terminal determination information. This allows executing the distribution control eliminating the need for complicated calculations.

As described in the second exemplary processing of the main terminal type determination processing, "smart phone" and "PC" are provided as the terminal type. The target terminal setting part determines "smart phone" as the main terminal type according to the proportion of "smart phone" in the accumulated terminal determination information exceeding the first threshold. The target terminal setting part determines "PC" as the main terminal type according to the proportion of "smart phone" in the terminal determination information falling below the second threshold. This allows providing the distribution control device 5 that can set the determination condition on the terminal type according to the situation.

Further, as described in the second exemplary processing of the main terminal type determination processing, the threshold TH2 is set to a value larger than the threshold TH3. This provides the hysteresis to the threshold when changing the main terminal type, ensuring preventing frequent change in the main terminal type.

As described in other modifications, one or both the threshold TH2 and the threshold TH3 are set according to the terminal type with which the web page to register the e-mail address has been browsed. This allows providing the distribution control device 5 that can estimate the terminal type mainly used by the user and flexibly set the thresholds.

When an initial setting of the distribution target terminal type is executed while the answer information cannot be obtained (="unanswered") from the user, the distribution target terminal type may be set corresponding to the terminal type through which the web page to register the e-mail address is browsed.

Further, as shown at Step S316 and Step S317 in FIG. 12B in the description of the modification regarding the display of the modal screen 9, in the case where the answer information based on the modal screen 9 is obtained, the target terminal setting part 5d determines the main terminal type based on the terminal determination information accumulated after the answer. This allows preventing the determination on the terminal type different from the answer information as the main terminal type until the predetermined count of the terminal determination information is accumulated. Further, this allows preventing the modal screen 9 to be presented to the user.

This allows providing the distribution control device 5 highly convenient for the users.

8. Programs and Storage Mediums

The distribution control device 5 of the present invention is described above. The program of the embodiments is a program causing a processing unit (such as a CPU) to execute processing in the distribution control device 5.

A program of the embodiment is configured as follows. The program causes a processing unit to execute processing to display a selection screen on a user terminal. The selection screen is configured to prompt selecting a terminal type for browsing content distributed based on registered content distribution destination information.

The program causes the processing unit to execute processing to generate terminal-determinable content to which a source code is added. The source code is configured to determine a terminal type used for browsing the content.

Further, the program causes the processing unit to execute processing to manage a terminal type answered based on the selection screen as answer information for each user. The program causes the processing unit to execute processing to accumulate and manage a terminal type determined according to a browsing of the distributed terminal-determinable content as terminal determination information for each user.

The program causes the processing unit to execute processing to determine a main terminal type mainly used by a user based on the accumulated terminal determination information. The program causes the processing unit to execute processing to set a distribution target terminal type for each user based on the answer information and the main terminal type.

The program causes the processing unit to execute distribution processing of the terminal-determinable content based on the distribution target terminal type.

That is, this program is a program that causes the processing unit to execute each processing shown at Step S101 to Step S103, which is described in FIG. 7, each processing shown at Step S301 to Step S317, which is described in FIG. 8 and FIGS. 12A and 12B, each processing shown at Step S501 to Step S505, which is described in FIG. 9, and each processing shown at Step S601 to Step S607, which is described in FIG. 10.

This program allows achieving the above-described distribution control device 5.

Such program can be preliminary stored in an HDD as a storage medium built into a device such as a computer device, a ROM in a microcomputer including a CPU, or a similar medium. Alternatively, a removable storage medium, such as a semiconductor memory, a memory card, an optical disk, a magneto-optical disk, or a magnetic disk, can store (memorize) the program temporarily or permanently. Such removable storage medium can be provided as so-called package software.

Such program can be installed from the removable storage medium to a personal computer or a similar device. Besides, the program can also be downloaded from a download site via a network such as a LAN and the Internet.

REFERENCE SIGNS LIST 1 service providing system
2 communication network
3 e-mail server
4 user terminal
5 distribution control device 5a selection screen presentation processing part
5b terminal information management part
5c access analysis part
5d target terminal setting part
5e e-mail generation part
5f distribution processing part
5g communication control part
6 user DB
7 advertisement DB
8 image DB
9 modal screen

What is claimed is:

1. A distribution control device, comprising:
a selection screen presentation processing part configured to execute processing to display a selection screen on a user terminal, the selection screen being configured to prompt selecting a terminal type for browsing content distributed based on registered content distribution destination information, the terminal type including at least a first type terminal and a second type terminal;
a content generation part configured to generate terminal-determinable content to which a source code is added as content distributed based on registered content distribution destination information, the source code being configured to determine a terminal type used for browsing the content;
a terminal information management part configured to manage the terminal type answered based on the selection screen as answer information for each user, the terminal information management part being configured to accumulate and manage the terminal type determined according to a browsing of the distributed terminal-determinable content as terminal determination information for each user;
a target terminal setting part configured to determine a main terminal type mainly used by a user based on the accumulated terminal determination information, the target terminal setting part being configured to set a distribution target terminal type for each user based on the answer information and the main terminal type; and
a distribution processing part configured to execute distribution processing of the terminal-determinable content based on the distribution target terminal type,
wherein,
the target terminal setting part is configured to set the distribution target terminal type based on the answer information when the answer information is obtained,
in a state where the latest answer information and the distribution target terminal type are set as the first type terminal, in the case where the second type terminal is determined as the main terminal type, the target terminal setting part is configured to set the second type terminal as the distribution target terminal type, and
in a state where the latest answer information and the distribution target terminal type are set as the second type terminal or in a state where the answer information is failed to be obtained and the distribution target terminal type is set as the second type terminal, in the case where the first type terminal is determined as the main terminal type, the target terminal setting part is configured to maintain a state where the second type terminal is set as the distribution target terminal type.

2. The distribution control device according to claim 1, wherein
in a state where the latest answer information is set as the first type terminal and the distribution target terminal type is set as the second type terminal, in the case where the first type terminal is determined as the main terminal type, the target terminal setting part is configured not to display the selection screen but sets the distribution target terminal type as the first type terminal.

3. The distribution control device according to claim 1, wherein
in the case where an answer based on the selection screen is not obtained, the target terminal setting part is configured to set the second type terminal as the distribution target terminal type.

4. The distribution control device according to claim 1, wherein
the target terminal setting part is configured to set the distribution target terminal type for each user for a user who has accepted a distribution of content for the first type terminal, and
the distribution processing part is configured to execute the distribution processing.

5. The distribution control device according to claim 1, wherein
the target terminal setting part is configured to determine the main terminal type using a proportion of a terminal type in the accumulated terminal determination information.

6. The distribution control device according to claim 5, wherein
the target terminal setting part is configured to determine the first type terminal as a main terminal type according to a proportion of the first type terminal in the accumulated terminal determination information exceeding a first threshold, and
the target terminal setting part is configured to determine the second type terminal as the main terminal type according to the proportion of the first type terminal in the terminal determination information falling below a second threshold.

7. The distribution control device according to claim 6, wherein
the first threshold is set to a value larger than the second threshold.

8. The distribution control device according to claim 6, wherein
one or both the first threshold and the second threshold are set according to the terminal type with which a web page to register content distribution destination information has been browsed.

9. The distribution control device according to claim 1, wherein
in the case where an answer based on the selection screen is obtained, the target terminal setting part is configured to determine the main terminal type based on the terminal determination information accumulated after the answer.

10. A distribution control method to be executed by information processing device comprising:
executing processing to display a selection screen on a user terminal, the selection screen being configured to prompt selecting a terminal type for browsing content distributed based on registered content distribution destination information, the terminal type including at least a first type terminal and a second type terminal;
generating terminal-determinable content to which a source code is added as content distributed based on registered content distribution destination information, the source code being configured to determine a terminal type used for browsing the content;

managing a terminal type answered based on the selection screen as answer information for each user, accumulating and managing a terminal type determined according to a browsing of the distributed terminal-determinable content as terminal determination information for each user;

determining a main terminal type mainly used by a user based on the accumulated terminal determination information, setting a distribution target terminal type for each user based on the answer information and the main terminal type; and executing distribution processing of the terminal-determinable content based on the distribution target terminal type, wherein, setting a distribution target terminal type includes, setting the distribution target terminal type based on the answer information when the answer information is obtained, setting the second type terminal as the distribution target terminal type in a state where the latest answer information and the distribution target terminal type are set as the first type terminal, in the case where the second type terminal is determined as the main terminal type, and maintaining a state where the second type terminal is set as the distribution target terminal type in a state where the latest answer information and the distribution target terminal type are set as the second type terminal or in a state where the answer information is failed to be obtained and the distribution target terminal type is set as the second type terminal, in the case where the first type terminal is determined as the main terminal type.

11. A storage medium for storing a program configured to cause a processing unit to execute:

a procedure configured to display a selection screen on a user terminal, the selection screen being configured to prompt selecting a terminal type for browsing content distributed based on registered content distribution destination information, the terminal type including at least a first type terminal and a second type terminal;

a procedure configured to generate terminal-determinable content to which a source code is added as content distributed based on registered content distribution destination information, the source code being configured to determine a terminal type used for browsing the content;

a procedure configured to manage a terminal type answered based on the selection screen as answer information for each user, the procedure being configured to accumulate and manage a terminal type determined according to a browsing of the distributed terminal-determinable content as terminal determination information for each user;

a procedure configured to determine a main terminal type mainly used by a user based on the accumulated terminal determination information, the procedure being configured to set a distribution target terminal type for each user based on the answer information and the main terminal type; and a procedure configured to distribute the terminal-determinable content based on the distribution target terminal type, wherein, the procedure of setting a distribution target terminal type includes, a procedure of setting the distribution target terminal type based on the answer information when the answer information is obtained, a procedure of setting the second type terminal as the distribution target terminal type in a state where the latest answer information and the distribution target terminal type are set as the first type terminal, in the case where the second type terminal is determined as the main terminal type, and a procedure of maintaining a state where the second type terminal is set as the distribution target terminal type in a state where the latest answer information and the distribution target terminal type are set as the second type terminal or in a state where the answer information is failed to be obtained and the distribution target terminal type is set as the second type terminal, in the case where the first type terminal is determined as the main terminal type.

* * * * *